US012788018B2

(12) United States Patent
Pratt et al.

(10) Patent No.: US 12,788,018 B2
(45) **Date of Patent: *Nov. 10, 2026**

(54) ANTIMICROBIAL GAS RELEASING AGENTS AND SYSTEMS AND METHODS FOR USING THE SAME

(71) Applicant: CSP Technologies, Inc., Auburn, AL (US)

(72) Inventors: Jason Pratt, Auburn, AL (US); Jonathan R. Freedman, Auburn, AL (US); Deepti S. Gupta, Glen Allen, VA (US); Michael A. Johnston, Marietta, GA (US); John Belfance, Phenix, AL (US); William Frederick Spano, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 1112 days.

This patent is subject to a terminal disclaimer.

(21) Appl. No.: 17/648,168

(22) Filed: Jan. 17, 2022

(65) Prior Publication Data

US 2022/0211043 A1 Jul. 7, 2022

Related U.S. Application Data

(63) Continuation-in-part of application No. 16/652,476, filed as application No. PCT/US2019/060937 on Nov. 12, 2019, now Pat. No. 11,224,219.

(60) Provisional application No. 62/760,519, filed on Nov. 13, 2018.

(51) Int. Cl.

| | |
|---|---|
| ***A01N 59/00*** | (2006.01) |
| ***A01N 25/08*** | (2006.01) |
| ***A01N 25/10*** | (2006.01) |
| ***B65D 25/14*** | (2006.01) |
| ***B65D 81/24*** | (2006.01) |

(52) U.S. Cl.

CPC ............ *A01N 59/00* (2013.01); *A01N 25/08* (2013.01); *A01N 25/10* (2013.01); *B65D 25/14* (2013.01); *B65D 81/24* (2013.01)

(58) Field of Classification Search

CPC ........ A01N 59/00; A01N 25/08; A01N 25/10; B65D 25/14; B65D 81/24; A01P 1/00

See application file for complete search history.

(56) References Cited

U.S. PATENT DOCUMENTS

| | | | | |
|---|---|---|---|---|
| 5,360,609 | A | 11/1994 | Wellinghoff | |
| 5,435,984 | A | 7/1995 | Daly et al. | |
| 5,885,543 | A | 3/1999 | Klatte | |
| 5,911,937 | A | 6/1999 | Hekal | |
| 6,080,350 | A | 6/2000 | Hekal | |
| 6,124,006 | A | 9/2000 | Hekal | |
| 6,130,263 | A | 10/2000 | Hekal | |
| 6,132,748 | A | 10/2000 | Khanna et al. | |
| 6,194,079 | B1 | 2/2001 | Hekal et al. | |
| 6,214,255 | B1 | 4/2001 | Hekal | |
| 6,265,343 | B1 | 7/2001 | Daly et al. | |
| 6,432,322 | B1 | 8/2002 | Speronello et al. | |
| 6,486,231 | B1 | 11/2002 | Hekal | |
| 6,676,850 | B2 * | 1/2004 | Speronello | A61L 9/01 423/477 |
| 6,699,404 | B2 | 3/2004 | Speronello et al. | |
| 6,764,661 | B1 | 7/2004 | Girard | |
| 7,005,459 | B2 | 2/2006 | Hekal | |
| 8,142,603 | B2 | 3/2012 | Sagona et al. | |
| 8,318,231 | B2 | 11/2012 | Warf, Jr. et al. | |
| 9,834,536 | B2 | 12/2017 | Takahashi et al. | |
| 9,902,788 | B2 | 2/2018 | Klein et al. | |
| 10,143,202 | B2 | 12/2018 | Chapman et al. | |
| 2005/0163854 | A1 | 7/2005 | Hartman | |
| 2005/0224750 | A1 | 10/2005 | Yang et al. | |
| 2005/0235830 | A1 | 10/2005 | Hughes | |
| 2007/0172412 | A1 | 7/2007 | Hratko et al. | |
| 2013/0017241 | A1 | 1/2013 | Andrews et al. | |
| 2013/0171239 | A1 | 7/2013 | Gilbard | |
| 2016/0039955 | A1 | 2/2016 | Klein et al. | |
| 2017/0028371 | A1 | 2/2017 | Takigawa et al. | |
| 2017/0156335 | A1 | 6/2017 | Bar-On et al. | |
| 2017/0332674 | A1 | 11/2017 | Annous et al. | |
| 2018/0290453 | A1 * | 10/2018 | Klein | B41J 2/16585 |
| 2019/0335746 | A1 | 11/2019 | Freedman et al. | |

FOREIGN PATENT DOCUMENTS

| | | | | |
|---|---|---|---|---|
| CN | 101247724 | A | 8/2008 | |
| CN | 102835421 | A | 12/2012 | |
| CN | 105073876 | A | 11/2015 | |
| CN | 105120669 | A | 12/2015 | |
| CN | 102239884 | A | 11/2016 | |
| CN | 108651453 | A | 10/2018 | |
| EP | 0526117 | A1 * | 2/1993 | C08K 5/20 |
| EP | 0973398 | B1 | 9/2003 | |
| EP | 3672405 | B1 | 9/2020 | |
| JP | S64-34904 | A | 2/1989 | |
| JP | 2001516213 | A | 9/2001 | |
| JP | 200237910 | A | 2/2002 | |

(Continued)

OTHER PUBLICATIONS

International Search Report for PCT/US2017/061389, mailed Jan. 18, 2018.

(Continued)

*Primary Examiner* — Snigdha Maewall

(74) *Attorney, Agent, or Firm* — Carol A. Marmo; Eckert Seamans Cherin & Mellott LLC

(57) ABSTRACT

Disclosed are antimicrobial releasing agents, methods of preparing the antimicrobial releasing agents, and entrained polymers containing antimicrobial releasing agents. The antimicrobial releasing agent is prepared with an acidified hydrophilic material with a pH below 3.5 as a carrier, an active compound, and a trigger. The entrained polymer of the invention releases an antimicrobial agent in gas form, such as $ClO_2$, optionally over a range of concentration from 150 ppm to 1800 ppm per gram of the entrained polymer under certain tested conditions.

22 Claims, 6 Drawing Sheets

(56) References Cited

FOREIGN PATENT DOCUMENTS

| | | | | |
|---|---|---|---|---|
| JP | 2009524572 | A | 7/2009 | |
| JP | 2009528351 | A | 8/2009 | |
| JP | 2010254669 | | 11/2010 | |
| JP | 2012-036072 | A | 2/2012 | |
| JP | 2015205234 | A | 11/2015 | |
| JP | 2016513748 | A | 5/2016 | |
| JP | 2018090481 | | 6/2018 | |
| TW | 1432007 | B | 5/2001 | |
| WO | 9639200 | A1 | 12/1996 | |
| WO | 1996041526 | A1 | 12/1996 | |
| WO | 9838865 | A1 | 9/1998 | |
| WO | 9961005 | A1 | 2/1999 | |
| WO | 03013843 | A1 | 2/2003 | |
| WO | WO-2005041660 | A1 * | 5/2005 | ............. A01N 25/10 |
| WO | 2007089473 | A2 | 8/2007 | |
| WO | WO-2014152539 | A1 * | 9/2014 | ........ B01J 20/28026 |
| WO | 2014/175261 | A1 | 10/2014 | |
| WO | 2014172543 | A1 | 10/2014 | |
| WO | 2016020755 | A2 | 2/2016 | |
| WO | 2017031349 | A1 | 2/2017 | |
| WO | 2018089933 | A1 | 5/2018 | |

OTHER PUBLICATIONS

Gorrepati, E.A., et al., Silica Precipitation in Acidic Solutions: Mechanism, pH Effect, and Salt Effect, Langmuir, Jul. 6, 2020, pp. 10467-10474, Retrieved from the Internet: URL:https://doi .org/10.1021/la904685x retrieved on Aug. 10, 2016].

Ali, H. A., et al., Synthesis of quality silica gel; Optimization of parameters, Journal of Faculty of Engineering & Technology, 2009, pp. xx-xx.

Ray, S., et al., Development of Chlorine Dioxide Releasing Film and Its Application in Decontaminating Fresh Produce, Journal of Food Science, vol. 78, Nr. 2, 2013.

Appendini, P., et al., Review of antimicrobial food packaging, Innovative Food Science & Emerging Technologies 3 2002), 113-126.

Occidental Chemical Corporation, Sodium chlorite laboratory preparations of chlorine dioxide solutions, Sodium Chlorite Jan. 2015.

International Search Report for PCT/US2019/060937, mailed Mar. 17, 2020.

International Search Report for PCT/US2019/032744, mailed Feb. 13, 2020.

Gorrepati et al., Silica Precipitation in Acidic Solutions: Mechanism, pH Effect, and Sal Effect, Langmuir 2010, 26, 13, 10467-10474, published Jun. 10, 2010, https://doi.org/10.1021/la904685x.

* cited by examiner

ANTIMICROBIAL GAS RELEASING AGENTS AND SYSTEMS AND METHODS FOR USING THE SAME

CROSS-REFERENCE TO RELATED APPLICATIONS

This application is a continuation-in-part of U.S. patent application Ser. No. 16/652,476, filed 31 Mar. 2020, published as US20200352160, which is a U.S. National Stage entry of PCT/US2019/060937, filed 12 Nov. 2019, published as WO2020/102206, which claims priority to U.S. Provisional Patent Application No. 62/760,519, filed on 13 Nov. 2018, the contents of all of which are incorporated herein by reference in their entirety.

BACKGROUND OF THE INVENTION

1. Field of Invention

This invention relates to compositions, systems and methods of reducing and preventing the growth of microbes, and/or for killing microbes, e.g., in food containers, using polymers entrained with antimicrobial releasing agents.

2. Description of Related Art

There are many items that are preferably stored, shipped and/or utilized in an environment that must be controlled and/or regulated. For example, in the moisture control field, containers and/or packages having the ability to absorb excess moisture trapped therein have been recognized as desirable. Likewise, in packaging products that carry a risk of contamination, e.g., food, it may be desirable to control the growth and proliferation of microbes.

Food products, particularly sliced or cut fresh foodstuffs such as meat, poultry, fruit, and vegetables are typically stored and sold in a supporting container, e.g., tray, that is overwrapped by a transparent plastic film, enabling visual inspection of the food products. These food products generally produce an exudate (i.e., juices), which can be a source for the growth of microbes. In addition, contamination of processing equipment or other surfaces with which the food products come into contact may remain with the food and proliferate while packaged. Similarly, food products may be contaminated even before the packaging process. For example, a tomato may have an opening in its skin through which unwanted microorganisms enter and replicate. Breakdown in the food handling process and/or cold chain management (e.g., refrigeration during food transport breaks for several hours) can allow microbial growth of contaminated food, potentially leading to outbreaks of food borne illness. Regardless of the source or nature of microbial contamination in food, the shelf-life and safety of the contaminated food products is affected by contamination and proliferation of microbes.

One way that the food industry has addressed preservation of foodstuffs is by including food grade preservatives as a component of the food, such as potassium sorbate, sodium benzoate and nitrites. However, such preservatives are regarded by some in the health field and consumers as being unnatural and presenting health risks. Moreover, it is not practical to use such preservatives with non-processed foods, for example, fresh fruits or vegetables.

Another way that the food industry has addressed food preservation is to utilize antimicrobial agents that directly contact the food as a component in packaging material. However, such direct contact may be undesirable in some applications.

For certain applications, it is desirable to provide antimicrobial agents to release antimicrobial gas into a headspace of the food product package or container to control the growth of microbes, as compared to a solid or liquid component that requires direct contact with the stored food in order to be effective. However, there are challenges with providing the antimicrobial gas in the headspace.

One such challenge is attaining a desired release profile of antimicrobial gas within the headspace during a designated time period. Failure to attain the appropriate release profile for a given product may result in a failure to achieve the desired shelf life for that product.

Another such challenge relates to the active agents currently available to release antimicrobial gas. One currently available antimicrobial releasing agent is provided under the brand ASEPTROL 7.05 by BASF Catalysts LLC. This material and preparation of the same is described in U.S. Pat. No. 6,676,850. Briefly, ASEPTROL is a chlorine dioxide releasing material that includes a sodium chlorite active compound, a clay carrier and a trigger. While ASEPTROL certainly has utility as a chlorine dioxide releasing material, it has certain disadvantages. One such disadvantage is that it is not sufficiently potent for certain applications and is not capable of having its potency altered. Another disadvantage is that it can be very unstable in processing and handling.

There exists a need for improved delivery of antimicrobial agents to control, reduce and substantially destroy microbial contamination in food packaging as well as other applications, such as but not limited to, packaging of sterilized disposable medical devices. A challenge in meeting this need is maintaining a balance between providing sufficient antimicrobial gas in the package headspace to effectively control and/or kill pathogens while not "overdosing" the package headspace, which could adversely affect the quality of the product, e.g., by organoleptic degradation. There is a need to address this challenge. There is also a need for an improved chlorine dioxide releasing material that can have its potency modified and tailored to provide a controllable release profile for a given application. It would be desired that such material provide improved processability in manufacture and safety in handling compared to the currently available ASEPTROL material.

SUMMARY OF THE INVENTION

Accordingly, in one aspect, the invention provides an antimicrobial releasing agent. The antimicrobial releasing agent includes a carrier material, an active compound, and a trigger. The carrier material has, optionally, a pH below about 3.5; optionally, a pH from about 1.4 to about 3.5; optionally from about 1.3 to about 3.2; optionally from about 1.36 to about 3.19; optionally, a pH from about 1.4 to about 3.1. The active compound is preferably a metal chlorite. In some embodiments, the metal chlorite is one or more members selected from the group consisting of lithium chlorite, sodium chlorite, potassium chlorite, rubidium chlorite, cesium chlorite and francium chlorite. The trigger preferably includes a hygroscopic compound. In one embodiment, the carrier material has been treated with one or more acids and is, for example, an acidified silica gel. Optionally, the trigger includes at least one of sodium chloride, calcium chloride, magnesium chloride, lithium chloride, magnesium nitrate, copper sulfate, aluminum sulfate, magnesium sulfate, calcium carbonate, phosphorus pentoxide, and lithium bromide. In some embodiments, the trigger is one or more members selected from the group consisting of: sodium chloride, potassium chloride, magnesium chloride, calcium chloride, barium chloride, sodium carbonate, potassium carbonate, magnesium carbonate, calcium carbonate, and barium carbonate. In some embodiments, the trigger is one or more members selected from the group consisting of: sodium chloride, magnesium chloride, calcium chloride, and calcium carbonate. In some embodiments, the trigger is selected from the group consisting of: sodium chloride, magnesium chloride, calcium chloride, and calcium carbonate. In an optional embodiment, the trigger is calcium chloride.

In another aspect, the invention provides a method for preparing an antimicrobial releasing agent. The method includes the steps of providing a carrier material at a pH of below 3.5 and mixing the carrier material with a trigger and an active compound to make the antimicrobial releasing agent. The carrier material has, optionally, a pH below about 3.5; optionally, a pH from about 1.4 to about 3.5; optionally from about 1.3 to about 3.2; optionally from about 1.36 to about 3.19; optionally, a pH from about 1.4 to about 3.1.

In another aspect, the invention provides an entrained polymer comprising a base polymer, an antimicrobial releasing agent, and optionally a channeling agent. The antimicrobial releasing agent includes a carrier material at a pH below 3.5, an active compound, and a trigger. The carrier material has, optionally, a pH below about 3.5; optionally, a pH from about 1.4 to about 3.5; optionally from about 1.3 to about 3.2; optionally from about 1.36 to about 3.19; optionally, a pH from about 1.4 to about 3.1.

Optionally, in any embodiment, the antimicrobial releasing agent is provided in at least one entrained polymer article located within the interior space. The entrained polymer article is a monolithic material that includes a base polymer, the antimicrobial releasing agent and optionally a channeling agent. Preferably, such entrained polymer is provided as a film having a thickness of from 0.1 mm to 1.0 mm, preferably from 0.2 mm to 0.6 mm, optionally about 0.2 or 0.3 mm. Preferably, such film is provided above the midline (preferably at least ⅔ or ¾) of the container sidewalls, which inventors have found helps to attain a desired antimicrobial gas release profile.

Optionally, in any embodiment, the chlorine dioxide gas releasing agent is provided in at least one entrained polymer article located within the interior space. The entrained polymer article is a monolithic material that includes a base polymer, the chlorine dioxide gas releasing agent and a channeling agent. Preferably, such entrained polymer is provided as a film having a thickness of from 0.1 mm to 1.0 mm, preferably from 0.2 mm to 0.6 mm, optionally about 0.2 or 0.3 mm. Alternatively, such entrained polymer may be produced in a hot melt application in which the entrained polymer composition has a melt flow index in a range from 200 g/10 min to 5000 g/10 min under the ASTM D1238/ISO 1133 conditions. Optionally, such entrained polymer composition has a viscosity in a range from 1,000 cp to 50,000 cp, when viscosity is measured with a rheometer at 190° C. after shearing at 5 Hz for two minutes. Hot melt dispensing apparatus and methods, which may optionally be used to dispense an entrained polymer comprising chlorine dioxide releasing agents, are described in PCT/US2018/049578, which is incorporated by reference herein in its entirety.

Accordingly, in one aspect, the invention provides a system to inhibit or prevent growth of microbes and/or to kill microbes in a closed container having a good that is located therein. The system optionally includes a container including a bottom surface, a top opening, one or more sidewalls extending in a vertical direction from the bottom surface to the top opening, an interior space formed by the one or more sidewalls, a headspace formed by the interior space that is not occupied by the good, and a cover to close and/or seal the container. The system also includes at least one entrained polymer article located within the interior space that includes a monolithic material, which includes a base polymer, and an antimicrobial releasing agent configured to release a released antimicrobial gas. The system further includes a selected material present in the interior space to activate the release of the released antimicrobial gas.

In another aspect, the invention provides a method for inhibiting or preventing the growth of microbes and/or for killing microbes in a closed container having a good located therein. The method includes forming at least one entrained polymer article, which includes obtaining a base polymer, and combining an antimicrobial releasing agent with the base polymer to form a monolithic material, wherein the antimicrobial releasing agent is configured to release a released antimicrobial material in gas form upon being activated by a selected material, e.g., moisture. The method also includes obtaining a container that includes a bottom surface, a top opening, one or more sidewalls extending in a vertical direction from the bottom surface to the top opening, an interior space formed by the one or more sidewalls, a headspace formed by the interior space that is not occupied by the good, and a cover to close and/or seal the container. The method further includes positioning the at least one entrained polymer article within the interior space of the container; placing the good in the container; covering the container; presenting the selected material in the interior space of the container; and releasing the released antimicrobial material within the interior space in a concentration effective for reducing or preventing the growth of microbes and/or for killing microbes present in and/or on the good.

In another aspect, a package is provided for inhibiting or preventing growth of microbes and/or for killing microbes in a closed container having a product located therein. The package includes a closed container defining an interior space therein. A product (optionally a food product) is provided within the interior space. A headspace is formed within a volume of the interior space that is not occupied by the product. An antimicrobial releasing agent is disposed within the interior space, the antimicrobial releasing agent releasing chlorine dioxide gas into the headspace by reaction of moisture with the antimicrobial releasing agent. The antimicrobial releasing agent is provided in an amount that releases the chlorine dioxide gas to provide a headspace concentration of from 6 parts per million (PPM) to 35 PPM for a period of 10 hours to 36 hours, optionally from 15 PPM to 30 PPM for a period of 16 hours to 36 hours, optionally from 15 PPM to 30 PPM for a period of about 24 hours.

Optionally, in any embodiment, when the product is provided within the interior space, the product is contaminated by at least one type of pathogen. The antimicrobial releasing agent provides a controlled release of chlorine dioxide gas to effectuate, after a span of 2 days, optionally 3 days, optionally 4 days, optionally 5 days, optionally 6 days, optionally 7 days, optionally 8 days, optionally 9 days, optionally 10 days, optionally 11 days, optionally 12 days, optionally 13 days from when the product is provided within the interior space and under storage conditions of 7° C., at least a 1 log base 10 reduction in colony forming units per gram (CFU/g), optionally at least a 2 log base 10 reduction in CFU/g, optionally at least a 3 log base 10 reduction in CFU/g, of the at least one type of pathogen, optionally at least a 4 log base 10 reduction in CFU/g, of the at least one type of pathogen. Optionally, the at least one pathogen is *Salmonella, E. Coli, Listeria* and/or *Geotrichum.*

Optionally, if the product is a food product and the amount of antimicrobial releasing agent and/or chlorine dioxide gas is present in an amount sufficient to effectuate the at least 1 log base 10 reduction in CFU/g (or at least 2 log base 10 reduction or at least 3 log base 10 reduction or at least 4 log base 10 reduction in CFU/g), of the at least one type of pathogen, such efficacy does not come at the expense of organoleptic degradation of the food product. For example the food product is not bleached or otherwise discolored, as perceived by an ordinary consumer without special detection equipment (i.e., no substantial organoleptic degradation).

Optionally, in any embodiment, the antimicrobial releasing agent is provided in at least one entrained polymer article located within the interior space. The entrained polymer article is a monolithic material that includes a base polymer, the antimicrobial releasing agent and optionally a channeling agent. Preferably, such entrained polymer is provided as a film having a thickness of from 0.1 mm to 1.0 mm, preferably from 0.2 mm to 0.6 mm, optionally about 0.3 mm. Preferably, such film is provided above the midline (preferably at least ⅔ or ¾) of the container sidewalls, which inventors have found helps to attain a desired antimicrobial gas release profile.

Optionally, in any embodiment, the antimicrobial releasing agent is a powdered mixture comprising an alkaline metal chlorite, preferably sodium chlorite. In some embodiments, the metal chlorite is one or more members selected from the group consisting of lithium chlorite, sodium chlorite, potassium chlorite, rubidium chlorite, cesium chlorite and francium chlorite. The powdered mixture further comprises at least one carrier, optionally acidified silica gel, and at least one humidity trigger, optionally calcium chloride. In some embodiments, the trigger is one or more members selected from the group consisting of: sodium chloride, potassium chloride, magnesium chloride, calcium chloride, barium chloride, sodium carbonate, potassium carbonate, magnesium carbonate, calcium carbonate, and barium carbonate. In some embodiments, the trigger is one or more members selected from the group consisting of: sodium chloride, magnesium chloride, calcium chloride, and calcium carbonate. In some embodiments, the trigger is selected from the group consisting of: sodium chloride, magnesium chloride, calcium chloride, and calcium carbonate. In an optional embodiment, the trigger is calcium chloride.

Optionally, in any embodiment, a method is provided for inhibiting or preventing the growth of microbes and/or for killing microbes in a closed container having a food product located therein. The method includes providing a closed container defining an interior space therein and a food product within the interior space. A headspace is formed within a volume of the interior space that is not occupied by the product. An antimicrobial releasing agent (such as that disclosed in this Summary section and elsewhere in this specification) is provided in the interior space. The agent releases an antimicrobial gas into the headspace by reaction of moisture with the antimicrobial releasing agent. The antimicrobial releasing agent is provided in an amount sufficient to release the antimicrobial gas to provide a desired headspace concentration of the antimicrobial gas over a predetermined amount of time. According to the method, if the product is contaminated by at least one type of pathogen at the time the product is provided within the interior space, the antimicrobial releasing agent optionally provides a controlled release of antimicrobial gas to effectuate, after a span of 2 days, optionally 3 days, optionally 4 days, optionally 5 days, optionally 6 days, optionally 7 days, optionally 8 days, optionally 9 days, optionally 10 days, optionally 11 days, optionally 12 days, optionally 13 days from when the product is provided within the interior space and under storage conditions of 7° C., at least a 1 log base 10 reduction in colony forming units per gram (CFU/g), optionally at least a 2 log base 10 reduction in CFU/g, optionally at least a 3 log base 10 reduction in CFU/g, of the at least one type of pathogen, optionally at least a 4 log base 10 reduction in CFU/g, of the at least one type of pathogen. Preferably, this method effectuates the reduction without causing substantial or reasonably perceptible (to the consumer) organoleptic degradation of the food product, for example without bleaching or otherwise causing noticeable discoloration of the food product. Preferably, the antimicrobial releasing agent is provided in an entrained polymer more preferably in an entrained polymer film, for example as described herein.

Optionally, in any embodiment of a package described herein, an aspect of the invention may include use of the package for storing a food product, wherein the food product exudes moisture that activates the antimicrobial releasing agent to release chlorine dioxide gas in the headspace. This use may attain desired headspace antimicrobial gas concentrations as described herein. This use may effectuate, after a span of 2 days, optionally 3 days, optionally 4 days, optionally 5 days, optionally 6 days, optionally 7 days, optionally 8 days, optionally 9 days, optionally 10 days, optionally 11 days, optionally 12 days, optionally 13 days from when the product is provided within the interior space and under storage conditions of 7° C., at least a 1 log base 10 reduction in colony forming units per gram (CFU/g), optionally at least a 2 log base 10 reduction in CFU/g, optionally at least a 3 log base 10 reduction in CFU/g, of the at least one type of pathogen, optionally at least a 4 log base 10 reduction in CFU/g, of the at least one type of pathogen. This is preferably done without causing substantial organoleptic degradation of the food product, for example without noticeably bleaching or otherwise discoloring the food product.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Definitions

Figure 1:
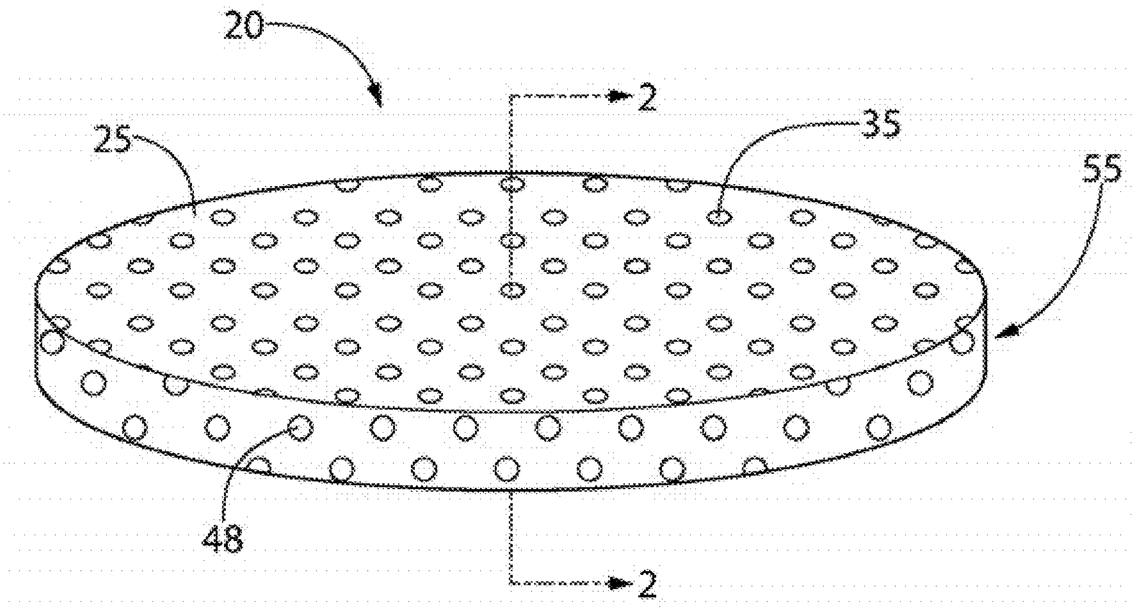
FIG. 1 is a perspective view of a plug formed of an entrained polymer that may be deposited onto a substrate according to methods of the disclosed concept.

As used herein, the term "active" is defined as capable of acting on, interacting with or reacting with a selected material (e.g., moisture or oxygen) according to an aspect of the invention. Examples of such actions or interactions may include absorption, adsorption or release of the selected material. Another example of "active", which is pertinent to a primary focus of the present invention is an agent capable of acting on, interacting with or reacting with a selected material (e.g., moisture) in order to cause release of a released material (e.g., chlorine dioxide).

As used herein, the term "active agent," in the context of an entrained polymer, is defined as a material that (1) is preferably immiscible with a base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb or release the selected material(s). The active agents of primary focus in this specification are those that release antimicrobial gas(es), preferably chlorine dioxide gas, e.g., when reacting with moisture.

The term "antimicrobial releasing agent" refers to an active agent that is capable of releasing a released antimicrobial material, e.g., in gas form. This antimicrobial releasing agent may include an active component and other components (such as a catalyst and trigger) in a formulation (e.g., powdered mixture) configured to release the antimicrobial gas. A "released antimicrobial material" is a compound that inhibits or prevents the growth and proliferation of microbes and/or kills microbes, e.g., chlorine dioxide gas. The released antimicrobial material is released by the antimicrobial releasing agent. By way of example only, an antimicrobial releasing agent may be triggered (e.g., by chemical reaction or physical change) by contact with a selected material (such as moisture). For example, moisture may react with an antimicrobial releasing agent to cause the agent to release a released antimicrobial material.

As used herein, the term "base polymer" is a polymer optionally having a gas transmission rate of a selected material that is substantially lower than, lower than or substantially equivalent to, that of a channeling agent mixed into the base polymer. By way of example, such a transmission rate is a water vapor transmission rate in embodiments where the selected material is moisture and the active agent is an antimicrobial gas releasing agent that is activated by moisture. This active agent may include an active component and other components in a formulation configured to release the antimicrobial gas. The primary function of the base polymer is to provide structure for the entrained polymer.

Suitable base polymers for use in optional embodiments of the invention include ethylene vinyl acetate, thermoplastic elastomers, thermoplastic polymers, e.g., polyolefins such as polypropylene and polyethylene, polyisoprene, polybutadiene, polybutene, polysiloxane, polycarbonates, polyamides, ethylene vinyl acetate, ethylene-methacrylate copolymer, poly(vinyl chloride), polystyrene, polyesters including polylactic acid, polyanhydrides, polyacrylianitrile, polysulfones, polyacrylic ester, acrylic, polyurethane and polyacetal, or copolymers or mixtures thereof.

In certain embodiments, the channeling agent has a water vapor transmission rate of at least two times that of the base polymer. In other embodiments, the channeling agent has a water vapor transmission rate of at least five times that of the base polymer. In other embodiments, the channeling agent has a water vapor transmission rate of at least ten times that of the base polymer. In still other embodiments, the channeling agent has a water vapor transmission rate of at least twenty times that of the base polymer. In still another embodiment, the channeling agent has a water vapor transmission rate of at least fifty times that of the base polymer. In still other embodiments, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer, an active agent and optionally also a channeling agent entrained or distributed throughout. An entrained polymer thus comprises at least two phases (base polymer and active agent without a channeling agent) or at least three phases (base polymer and active agent with a channeling agent).

As used herein, the term "monolithic," "monolithic structure" or "monolithic composition" is defined as a composition or material that does not consist of two or more discrete macroscopic layers or portions. Accordingly, a multi-layer composite is not itself a "monolithic composition," although it could potentially have a layer that is a monolithic composition.

As used herein, the term "phase" is defined as a portion or component of a monolithic structure or composition that is uniformly distributed throughout, to give the structure or composition its monolithic characteristics.

As used herein, the term "selected material" is defined as a material that is acted upon, by, or interacts or reacts with an active agent and is capable of being transmitted through the channels of an entrained polymer. For example, in embodiments in which a releasing material is the active agent, the selected material may be moisture that reacts with or otherwise triggers the active agent to release a releasing material, such as an antimicrobial gas, e.g., chlorine dioxide.

As used herein, the term "three phase" is defined as a monolithic composition or structure comprising three or more phases. An example of a three phase composition according to the invention is an entrained polymer formed of a base polymer, active agent, and channeling agent. Optionally, a three phase composition or structure may include an additional phase, e.g., a colorant, but is nonetheless still considered "three phase" on account of the presence of the three primary functional components.

Furthermore, the terms "package," "packaging" and "container" may be used interchangeably herein to indicate an object that holds, contains or is configured to hold or contain a good, e.g., food product and foodstuffs. Optionally, a package may include a container with a product stored therein. Non-limiting examples of a package, packaging and container include a tray, box, carton, bottle receptacle, vessel, pouch and flexible bag. A pouch or flexible bag may be made from, e.g., polypropylene or polyethylene. The package or container may be closed, covered and/or sealed using a variety of mechanisms including a cover, a lid, lidding sealant, an adhesive and a heat seal, for example. The package or container may be composed or constructed of various materials, such as plastic (e.g., polypropylene or polyethylene), paper, Styrofoam, glass, metal and combinations thereof. In one optional embodiment, the package or container is composed of a rigid or semi-rigid polymer, optionally polypropylene or polyethylene, and preferably has sufficient rigidity to retain its shape under gravity.

Exemplary Entrained Polymers

Conventionally, desiccants, oxygen absorbers and other active agents have been used in raw form, e.g., as loose particulates housed in sachets or canisters within packaging, to control the internal environment of the package. For many applications, it is not desired to have such loosely stored active substances. Thus, the present application provides active entrained polymers comprising active agents, wherein such polymers can be extruded and/or molded into a variety of desired forms, e.g., container liners, plugs, film sheets, pellets and other such structures.

Optionally, such active entrained polymers may include channeling agents, such as polyethylene glycol (PEG) and vinylpyrrolidone-vinyl acetate copolymer (PVPVA), which form channels between the surface of the entrained polymer and its interior to transmit a selected material (e.g., moisture) to the entrained active agent (e.g., desiccant to absorb the moisture). As explained above, entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth.

Suitable base polymers for use in the invention optionally include one or more of ethylene vinyl acetate, thermoplastic elastomers, thermoplastic polymers, e.g., polyolefins such as polypropylene and polyethylene, polyisoprene, polybutadiene, polybutene, polysiloxane, polycarbonates, polyamides, ethylene vinyl acetate, ethylene-methacrylate copolymer, poly(vinyl chloride), polystyrene, polyesters including polylactic acid, polyanhydrides, polyacrylianitrile, polysulfones, polyacrylic ester, acrylic, polyurethane and polyacetal, or copolymers or mixtures thereof.

Suitable channeling agents in the invention optionally include one or more of polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a polypropylene oxide-monobutyl ether, which is commercially available under the trade name Polyglykol B01/240, produced by CLARIANT. In other embodiments, the channeling agent could be a polypropylene oxide monobutyl ether, which is commercially available under the trade name Polyglykol B01/20, produced by CLARIANT, polypropylene oxide, which is commercially available under the trade name Polyglykol D01/240, produced by CLARIANT, ethylene vinyl acetate, nylon 6, nylon 66, or any combination of the foregoing.

Entrained polymers with antimicrobial releasing agents as the active agent are further described below.

Antimicrobial Releasing Agents and Optional Entrained Polymers Incorporating the Same FIGS. 1-6 and 8 illustrate entrained polymers 20 and various packaging assemblies formed of entrained polymers according to certain optional embodiments of the invention. The entrained polymers 20 each include a base polymer 25, optionally a channeling agent 35 and an active agent 30. The active agent 30 in preferred embodiments is an antimicrobial releasing agent. As shown, the channeling agent 35 forms interconnecting channels 45 through the entrained polymer 20. At least some of the active agent 30 is contained within these channels 45, such that the channels 45 communicate between the active agent 30 and the exterior of the entrained polymer 20 via channel openings 48 formed at outer surfaces of the entrained polymer 25. The active agent 30 can be, for example, any one of a variety of releasing materials, as described in further detail below. While a channeling agent, e.g., 35, is preferred, the invention broadly includes entrained polymers that optionally do not include a channeling agent. Suitable active agents according to the invention include antimicrobial releasing agents.

Figure 4:
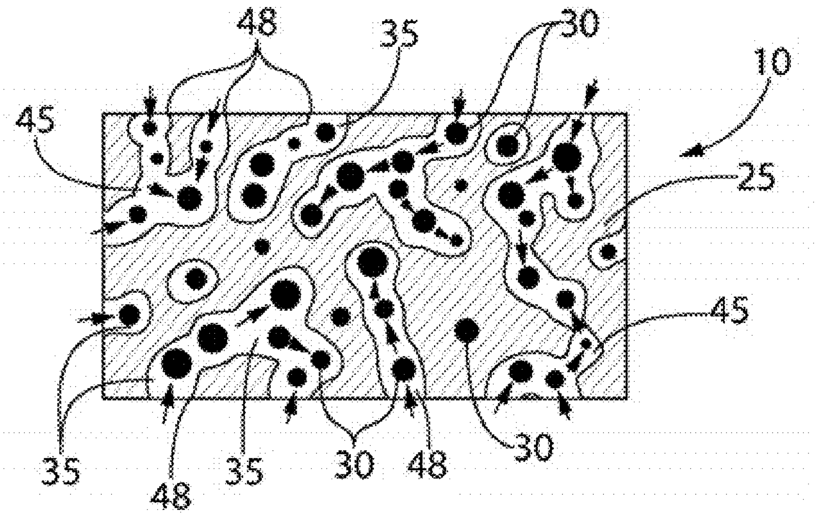
FIG. 4 is a schematic illustration of an entrained polymer according to an optional embodiment of the disclosed concept, in which the active agent is an antimicrobial gas releasing material that is activated by contact with a selected material (e.g., moisture).

FIG. 4 illustrates an embodiment of an entrained polymer 10 according to an optional aspect of the invention, in which the active agent 30 is an antimicrobial releasing agent. The arrows indicate the path of a selected material, for example moisture or another gas, from an exterior of the entrained polymer 10, through the channels 45, to the particles of active agent 30 (in this case, an antimicrobial releasing agent). Optionally, the antimicrobial releasing agent reacts with or is otherwise triggered or activated by the selected material (e.g., by moisture) and in response releases a released antimicrobial material, preferably in gas form. These figures are further elaborated upon, below.

The antimicrobial agents useful herein include volatile antimicrobial releasing agents, non-volatile antimicrobial releasing agents and combinations thereof.

The term "volatile antimicrobial releasing agent" includes any compound that when comes into contact with a fluid or gas (e.g., water, moisture or the juice from a food product), produces a gas and/or gas phase such as vapor of released antimicrobial agent. As will be discussed in greater detail below, the volatile antimicrobial releasing agent is generally used in a closed system so that the released antimicrobial material (gas and/or vapor) does not escape.

The term "non-volatile antimicrobial agent" includes any compound that when it comes into contact with a fluid (e.g., water or the juice from a food product), produces minimal to no vapor of antimicrobial agent. Examples of non-volatile antimicrobial agents include, but are not limited to, ascorbic acid, a sorbate salt, sorbic acid, citric acid, a citrate salt, lactic acid, a lactate salt, benzoic acid, a benzoate salt, a bicarbonate salt, a chelating compound, an alum salt, nisin, ε-polylysine 10%, methyl and/or propyl parabens, or any combination of the foregoing compounds. The salts include the sodium, potassium, calcium, or magnesium salts of any of the compounds listed above. Specific examples include calcium sorbate, calcium ascorbate, potassium bisulfite, potassium metabisulfite, potassium sorbate, or sodium sorbate.

Preferred features of antimicrobial releasing agents used according to an aspect of the present invention include any one or more of the following characteristics: (1) they volatize at refrigerated temperatures; (2) they are food safe; (3) they may be incorporated safely into an entrained polymer formulation or other mechanism for release; (4) they are shelf stable in long term storage conditions; (5) they release the released antimicrobial material only once a package in which the agent is disposed, is sealed with product disposed in the package; (6) they do not substantially affect a stored food product organoleptically when they are formulated and configured to achieve a desired release profile within the package; and (7) they are preferably acceptable under applicable governmental regulations and/or guidelines pertaining to food packaging and finished food labeling.

Antimicrobial Releasing Agent—Chlorine Dioxide Releasing Agent

In one aspect of the invention, an antimicrobial releasing agent is a volatile antimicrobial agent that releases chlorine dioxide ($ClO_2$) in gas form as the released antimicrobial material. For example, the antimicrobial releasing agent may be a compound or composition comprising 1) an active compound, 2) a carrier material, and 3) a trigger, which in combination are triggered or activated by moisture to cause the agent to release chlorine dioxide.

As noted in the Background section above, an existing antimicrobial releasing agent is provided under the brand ASEPTROL 7.05 by BASF Catalysts LLC, as described in U.S. Pat. No. 6,676,850. Applicant has invented new and unique antimicrobial releasing agents that optionally provide certain advantages over ASEPTROL. Applicant's invention includes chlorine dioxide gas releasing agents that provide controllable release profiles and desirable processability in manufacture. Applicant's new $ClO_2$ releasing agents are more amenable to industry scale production, are relatively stable, and adaptable for a process of producing an entrained polymer at high loading levels. Specifically, the invention provides a $ClO_2$ releasing composition comprising an active compound, a carrier material, and a trigger. Optionally, the antimicrobial releasing agent of the invention is a dry powder. The application now describes each of the aforementioned components of $ClO_2$ releasing compositions according to optional aspects of the invention.

Active Compound

A variety of metal chlorites may be utilized as the active compound in preparing the antimicrobial releasing agent, including alkali metal chlorites, alkaline earth metal chlorites, and transitional metal chlorites. In one embodiment, the metal chlorites are alkali metal chlorites such as sodium chlorite and potassium chlorite. In another embodiment, the metal chlorites are alkaline earth chlorites such as barium chlorite, calcium chlorite and magnesium chlorite. In some embodiments, the metal chlorite is one or more members selected from the group consisting of lithium chlorite, sodium chlorite, potassium chlorite, rubidium chlorite, cesium chlorite and francium chlorite. In an optional embodiment, the metal chlorite is sodium chlorite.

The metal chlorites are available from a variety of commercial sources. Technical grade flaked sodium chlorite (80%) is available from Acros, Aldrich Chemical Co., and Alfa Asser. Calcium chlorite and potassium chlorite are available from T. J. Baker Co. and Aldrich Chemical Co., respectively. Generally, these commercial chlorites are dried (e.g., at 300° C. for 3 hours) and cooled prior to use.

Carrier Material

In one aspect, the carrier material comprises a material with a pH below 3.5. The pH herein refers to the pH of the aqueous phase of the carrier material suspended or dissolved in water. Optionally, a 2 g sample of the carrier material is suspended in 10 mL water. The pH of the aqueous phase is measured. Optionally, the carrier material is a hydrophilic material. Optionally, the carrier material is a dry solid material, or a dry solid inorganic material. In an optionally embodiment, the carrier material is an acidified silica gel. In another optional embodiment, the carrier material has been treated with one or more acids. Optionally, the acid is a mineral acid, optionally selected from a group consisting of sulfuric acid, hydrochloric acid, and nitric acid. Optionally, the native carrier material is treated with one or more acids so that the pH of the aqueous phase of the resulting treated carrier material is below 3.5. Optionally, the pH of the aqueous phase of the resulting treated hydrophilic material is from about 0.5 to about 3.5, optionally from about 0.5 to about 3.0, optionally from about 1.0 to about 3.5, optionally from about 1.0 to about 3.0, or optionally from about 1.0 to about 2.0. Optionally, the pH of the aqueous phase of the resulting treated hydrophilic material is from about 1.5 to about 1.8, or from about 1.0 to about 1.5. Applicant has found that a pH of the aqueous phase of 1.4 to 3.1 provides a desirable window that nicely balances safety and efficacy. In other words, the immediately aforementioned range provides a "safe zone" for processing and handling the material while also providing desirable chlorine dioxide release properties. Optionally, the carrier material is dried (e.g., at 300° C. for 3 hours) after acidification and cooled prior to use.

Optionally, the native carrier material is soaked in a mineral acid solution. The concentration of the mineral acid solution concentration can range from about 0.1 M to saturated, depending on the desired pH value of the carrier material.

Trigger

In another aspect, the trigger comprises a hygroscopic material. Optionally, the hygroscopic material is a hygroscopic salt. Optionally, the hygroscopic material is any one of sodium chloride, calcium chloride, magnesium chloride, lithium chloride, magnesium nitrate, copper sulfate, aluminum sulfate, magnesium sulfate, calcium carbonate, phosphorus pentoxide, and/or lithium bromide. In some embodiments, the trigger is one or more members selected from the group consisting of: sodium chloride, potassium chloride, magnesium chloride, calcium chloride, barium chloride, sodium carbonate, potassium carbonate, magnesium carbonate, calcium carbonate, and barium carbonate. In some embodiments, the trigger is one or more members selected from the group consisting of: sodium chloride, magnesium chloride, calcium chloride, and calcium carbonate. In some embodiments, the trigger is selected from the group consisting of: sodium chloride, magnesium chloride, calcium chloride, and calcium carbonate. In an optional embodiment, the trigger is calcium chloride. Generally, the hygroscopic material is dried (e.g., at 300° C. for 3 hours) and cooled prior to use.

Typically, due to the hygroscopicity of the trigger, moisture is pooled and collected which then initiates the reaction with the active compound leading to the release of chlorine dioxide.

Chlorine Dioxide Releasing Agent

Each of the components of the chlorine dioxide releasing agent described above is prepared separately. For example, the carrier material and the trigger are prepared individually, then are ultimately combined with the active compound.

Optionally, the carrier material is an acidified silica gel. Optionally, the acidified silica gel is prepared by treating the native silica gel with aqueous sulfuric acid solution to give a slurry. The slurry is dried thoroughly with heat to afford an acidified silica gel in a dry state. Optionally, the pH of the acidified silica gel is below 3.5, optionally from about 1.0 to about 3.5, optionally from about 1.4 to about 3.5, optionally from about 1.3 to about 3.2, optionally from about 1.36 to about 3.19, optionally from about 1.4 to about 3.1, optionally from about 1.0 to about 3.0, optionally from about 1.0 to about 2.0, optionally from about 1.0 to about 1.5, optionally from about 1.5 to about 1.8, optionally from about 1.5 to about 3.0, optionally from about 1.5 to about 2.5, optionally from about 1.5 to about 1.8, optionally from about 2.0 to about 3.0, optionally from about 2.0 to about 2.5. The pH is measured by a standard method, for example, measuring the pH of the aqueous phase of 2 g of the acidified silica gel in 10 mL water.

The carrier material is then mixed with the trigger and the active compound in any order. In an optional embodiment, the carrier material (such as an acidified silica gel) is mixed with the trigger (such as $CaCl_2$) to give a mixture. Optionally, the mixture is finally combined with the active compound (such as a metal chlorite including $NaClO_2$) to make the $ClO_2$ releasing active agent. In another embodiment, the carrier material is mixed with the active compound and then mixed with the trigger. In another embodiment, the carrier material is mixed with active compound and the trigger simultaneously.

The amounts of the active compound, the carrier material, and the trigger in the antimicrobial releasing agent depend on several factors, including but not limited to the specific components chosen, the desired quantity of chlorine dioxide gas released, the rate of the desired release of chlorine dioxide gas, and the total amount of the antimicrobial releasing agent desired for use. However, the chlorine dioxide gas release profile is more sensitive to the acidity and the dryness of the carrier material than to other factors such as the amount of the active material.

In any embodiment, the carrier material is optionally 50%-90% by weight with respect to the total weight of the antimicrobial releasing agent. Optionally, the carrier material is 60%-90%, optionally 60%-80%, optionally 60%-70%, optionally 70%-90%, optionally 70%-80% by weight with respect to the total weight of the antimicrobial releasing agent.

In any embodiment, the active compound is optionally 5%-30% by weight with respect to the total weight of the antimicrobial releasing agent. Optionally, the active compound is 7%-25%, optionally 9%-20%, optionally 11%-20% by weight with respect to the total weight of the antimicrobial releasing agent.

In any embodiment, the trigger is optionally 2%-20% by weight with respect to the total weight of the antimicrobial releasing agent. Optionally, the trigger is 5%-18%, optionally 8%-15%, optionally about 10% by weight with respect to the total weight of the antimicrobial releasing agent.

According to one embodiment of the invention, the $ClO_2$ releasing agent thus prepared is a dry solid and hygroscopic, and is sealed and stored under nitrogen until use.

Figure 7:
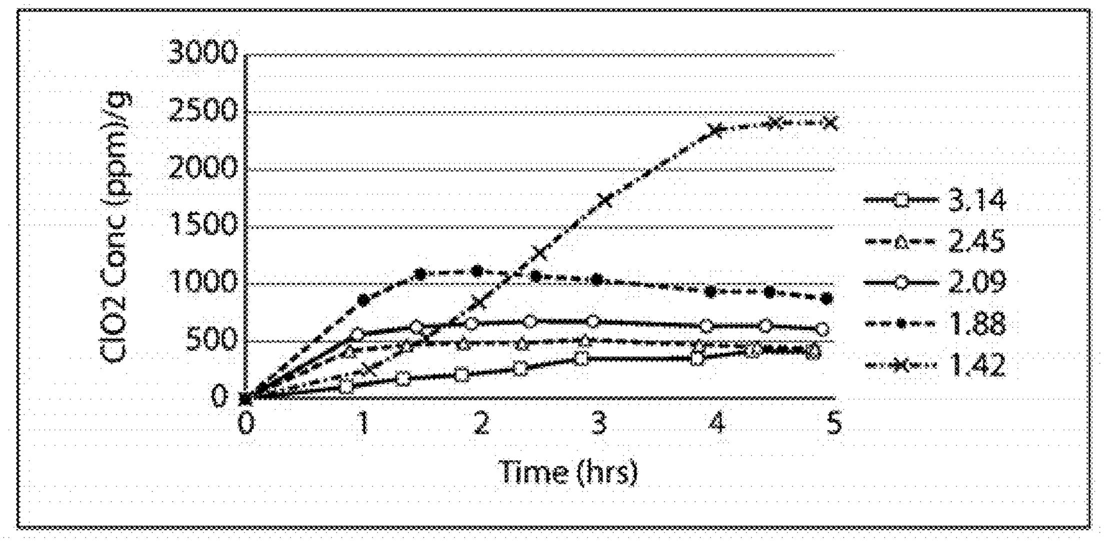
FIG. 7 is a graph of $ClO_2$ release profiles of exemplary $ClO_2$ releasing agents according to the disclosed concept, at various pH values.

The $ClO_2$ release properties of the $ClO_2$ releasing agents according to optional aspects of the invention are profiled in FIG. 7. Exemplary embodiments of the $ClO_2$ releasing agents of the disclosed concept were prepared according to the following composition: acidified silica gel 77%, sodium chlorite 13%, and calcium chloride 10%. The graph of FIG. 7 illustrates release properties of this composition at different pH levels, from pH 1.42 to pH 3.14. The graph shows that the lowest pH provided the highest level $ClO_2$ concentration and the highest pH provided the lowest level $ClO_2$ concentration. This data demonstrates that variation of pH allows one to modulate the $ClO_2$ concentration to targeted levels.

The $ClO_2$ releasing agent per gram prepared according to optional aspects of the invention provides a $ClO_2$ concentration from 1000 ppm to 4000 ppm at room temperature (23° C.), when gas release is initiated by contact with moisture. Optionally, the $ClO_2$ concentration is: from 1000 ppm to 3500 ppm, optionally from 1000 ppm to 3000 ppm, optionally from 1000 ppm to 2500 ppm, optionally from 1000 ppm to 2000 ppm, optionally from 1000 ppm to 1500 ppm, optionally from 1500 ppm to 3500 ppm, optionally from 1500 ppm to 3000 ppm, optionally from 1500 ppm to 2500 ppm, optionally from 1500 ppm to 2000 ppm, optionally from 2000 ppm to 3500 ppm, optionally from 2000 ppm to 3000 ppm, optionally from 2000 ppm to 2500 ppm, optionally from 2500 ppm to 3500 ppm, optionally from 2500 ppm to 3000 ppm, optionally from 3000 ppm to 3500 ppm.

The $ClO_2$ concentration referred to herein was measured as follows. A sponge (1"×1"×½") was placed at the bottom of a 2.1 L mason glass jar. Water (10 mL) was added to the sponge. The water was completely absorbed in the sponge and there was no free water visible. A sample of the $ClO_2$ releasing agent in a powder form (2 g) was placed at the bottom of the glass jar where there was no physical contact with the sponge. The glass jar was sealed and shielded from ambient light. The $ClO_2$ concentration in the headspace was monitored. A gas transport line including an output line and a return line diverted the air in the headspace to a portable $ClO_2$ gas analyzer before being returned.

Entrained Polymer Containing Antimicrobial Releasing Agent

Optionally, the antimicrobial releasing agent is a component of an entrained polymer, which is at least two phases and comprises the antimicrobial releasing agent and a base polymer. Preferably, the entrained polymer is at least three phases and comprises the antimicrobial releasing agent, a base polymer, and a channeling agent. The form of the entrained polymer is not limited. Optionally, such entrained polymer is in the form of a film, a sheet, or a plug, for example.

In general, it is believed that the higher the active agent concentration in the mixture, the greater the absorption, adsorption or releasing capacity (as the case may be) will be of the final composition. However, too high an active agent concentration could cause the entrained polymer to be more brittle, and the molten mixture of active agent, base polymer material and channeling agent to be more difficult to either thermally form, extrude or injection mold.

In one embodiment, the antimicrobial releasing agent loading level ranges from 20% to 80%, optionally from 40% to 70%, optionally from 40% to 60%, optionally from 40% to 50%, optionally from 45% to 65%, optionally from 45% to 60%, optionally from 45% to 55%, optionally from 50% to 70%, optionally from 55% to 65%, by weight with respect to the total weight of the entrained polymer. According to the invention, the optional loading level for the $ClO_2$ releasing agent of the invention is selected taking into consideration factors such as safety. For example, at loading levels above about 50% for the $ClO_2$ releasing agent with silica gel at a pH<2.5, the entrained polymer components at operating temperatures may be a fire hazard. Accordingly, for such embodiments, the loading level for the $ClO_2$ releasing agent is from 20% to 60%, optionally 20% to 55%, optionally 20% to 50%, optionally 30% to 60%, optionally 30% to 55%, optionally 30% to 50%, optionally 40% to 60%, optionally 40% to 55%, optionally 40% to 50%, optionally 45% to 60%, optionally 50% to 55%.

Optionally, the base polymer ranges from 10% to 70%, optionally from 15% to 60%, optionally from 15% to 50%, optionally from 15% to 40%, optionally from 20% to 60%, optionally from 20% to 50%, optionally from 20% to 40%, optionally from 20% to 35%, optionally from 25% to 60%, optionally from 25% to 50%, optionally from 25% to 40%, optionally from 25% to 30%, optionally from 30% to 60%, optionally from 30% to 50%, optionally from 30% to 45%, optionally from 40% to 60%, optionally from 40% to 50% by weight of the entrained polymer.

Because the $ClO_2$ releasing agent degrades at high temperatures, the base polymers particularly suitable for use in the invention include those thermoplastic elastomers and thermoplastic polymers with a melting temperature at or below 180° C. Examples include polyolefins such as polypropylene and polyethylene, polyisoprene, polybutadiene, polybutene, polyamides, ethylene vinyl acetate, ethylene-methacrylate copolymer, poly(vinyl chloride), polyesters including polylactic acid, or copolymers or mixtures thereof.

Optionally, the channeling agent ranges from 1% to 25%, optionally 1% to 20%, optionally 1% to 15%, optionally 2% to 15%, optionally 5% to 20%, optionally from 5% to 15%, optionally from 5% to 10%, optionally from 8% to 15%, optionally from 8% to 10%, optionally from 10% to 20%, optionally from 10% to 15%, or optionally from 10% to 12%, by weight with respect to the total weight of the entrained polymer.

In one embodiment, an entrained polymer may be a three phase formulation including 35% to 60% by weight of the antimicrobial releasing agent in the form of the powdered mixture described above, 30% to 50% by weight a base polymer (such as ethylene vinyl acetate (EVA)), and 5% to 12% by weight a channeling agent (such as polyethylene glycol (PEG)). The base polymer and the channeling agent are not particularly limited.

Methods of producing entrained polymers 10 according to optional aspects of the invention are not particularly limited. Examples include blending a base polymer 25 and a channeling agent 35. The active agent 30 is blended into the base polymer 25 either before or after adding the channeling agent 35. All three components are uniformly distributed within the entrained polymer 10 mixture. The entrained polymer thus prepared contains at least three phases.

FIGS. 1-6 and 8 illustrate entrained polymers 10 and various packaging assemblies formed of entrained polymers according to the invention. The entrained polymers 10 each include a base polymer material 25, a channeling agent 35 and an active agent 30. As shown, the channeling agent 35 forms interconnecting channels 45 through the entrained polymer 10. At least some of the active agent 30 is contained within these channels 45, such that the channels 45 communicate between the active agent 30 and the exterior of the entrained polymer 10 via channel openings 48 formed at outer surfaces of the entrained polymer 10. The active agent 30 can be, for example, any one of a variety of absorbing, adsorbing or releasing materials. The term "an active agent" may be understood as "an antimicrobial releasing agent" or "a $ClO_2$ releasing agent" according to the context. While a channeling agent, e.g., 35, is preferred, the disclosed concept broadly includes entrained polymers that optionally do not include channeling agents.

FIG. 1 shows a plug 55 constructed of an entrained polymer 20, in accordance with certain embodiments of the invention. The plug 55 may be placed inside of a container. As aforementioned, the entrained polymer 20 includes a base polymer 25, a channeling agent 35 and an active agent 30.

Figure 2:
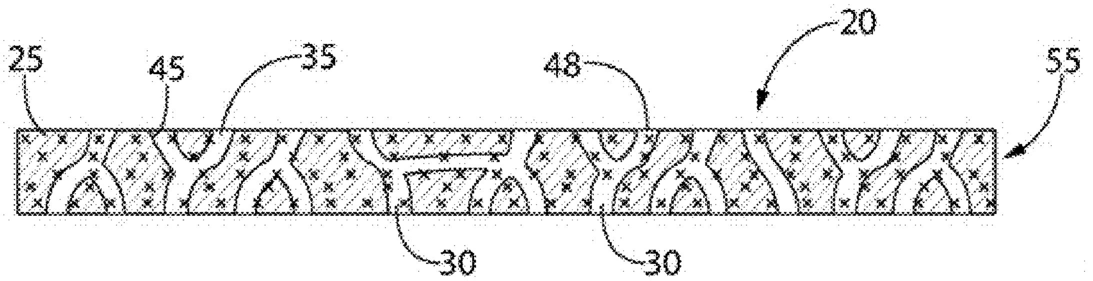
FIG. 2 is a cross section taken along line 2-2 of FIG. 1.

FIG. 2 shows a cross-sectional view of the plug 55 shown in FIG. 1. In addition, FIG. 2 shows that the entrained polymer 20 has been solidified such that the channeling agent 35 forms interconnecting channels 45 to establish passages throughout the solidified plug 55. At least some of the active agent 30 is contained within the channels 45, such that the channels 45 communicate between the active agent 30 and the exterior of the entrained polymer 20 via channel openings 48 formed at outer surfaces of the entrained polymer 25.

Figure 3:
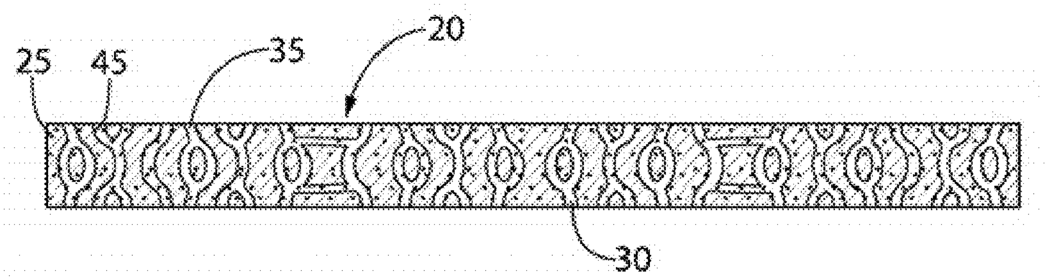
FIG. 3 is a cross section similar to that of FIG. 2, showing a plug formed of another embodiment of an entrained polymer according to an optional embodiment of the disclosed concept.

FIG. 3 illustrates an embodiment of a plug 55 having similar construction and makeup to the plug 55 of FIG. 2, where interconnecting channels 45 are finer as compared to those shown in FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lower viscosity of the blend, which may promote a more thorough blending of the base polymer 25 and channeling agent 35, which under normal conditions can resist combination into a uniform solution. Upon solidification of the entrained polymer 20 having a dimer agent added thereto, the interconnecting channels 45 which are formed there-through have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally acts as a barrier to resist permeation of these materials. For this reason, the base polymer 25 itself acts as a barrier substance within which an active agent 30 may be entrained. The interconnecting channels 45 formed of the channeling agent 35 provide pathways for the desired material to move through the entrained polymer 10. Without these interconnecting channels 45, it is believed that relatively small quantities of the desired material would be transmitted through the base polymer 25 to or from the active agent 30. Additionally, wherein the desired material is transmitted from the active agent 30, it may be released from the active agent 30, for example in embodiments in which the active agent 30 is a releasing material, such as an antimicrobial gas releasing material.

FIG. 4 illustrates an embodiment of an entrained polymer 10 according to the disclosed concept, in which the active agent 30 is an absorbing or adsorbing material. The arrows indicate the path of the selected material, for example moisture or gas, from an exterior of the entrained polymer 10, through the channels 45, to the particles of active agent 30, which absorb or adsorb the selected material.

Figure 5:
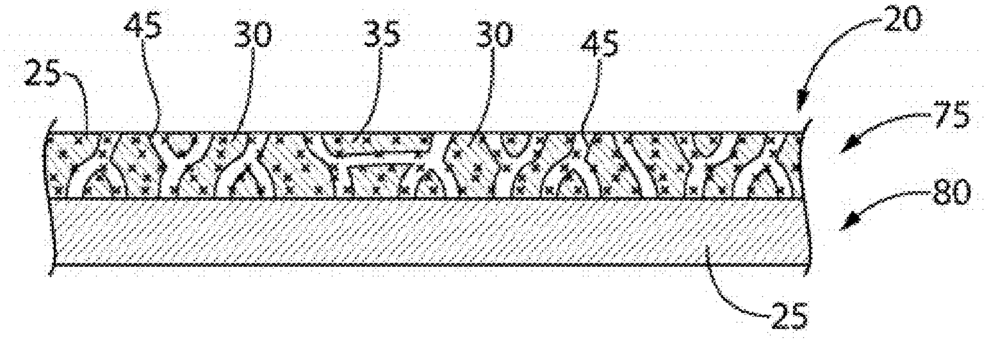
FIG. 5 is a cross sectional view of a sheet or film formed of an entrained polymer according to an optional embodiment of the disclosed concept, adhered to a barrier sheet substrate.

FIG. 5 illustrates an active sheet or film 75 formed of the entrained polymer 20 used in combination with a barrier sheet 80 to form a composite, according to an aspect of the invention. The characteristics of the active sheet or film 75 are similar to those described with respect to the plug 55. The barrier sheet 80 may be a substrate such as foil and/or a polymer with low moisture or oxygen permeability. The barrier sheet 80 is compatible with the entrained polymer structure 75 and is thus configured to thermally bond to the active sheet or film 75, when the active sheet or film 75 solidifies after dispensing.

Figure 6:
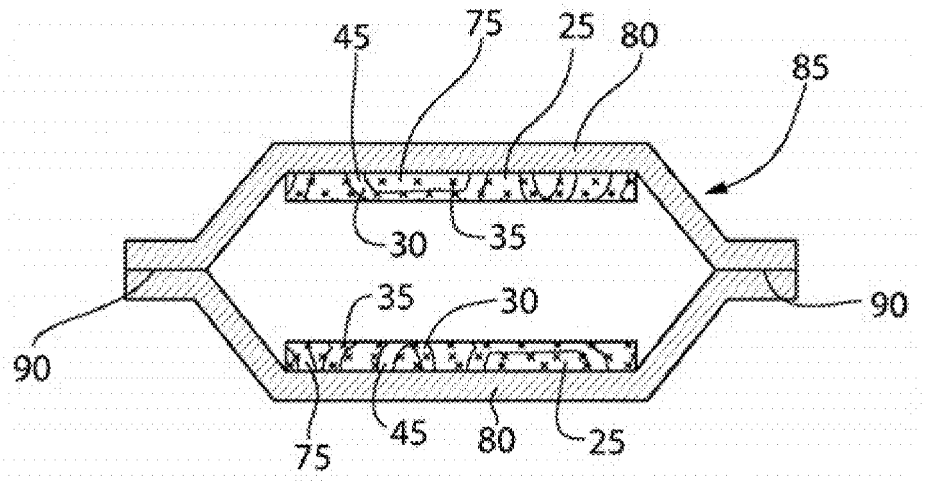
FIG. 6 is a cross section of a package that may be formed using an entrained polymer according to an optional embodiment of the disclosed concept.

FIG. 6 illustrates an embodiment in which the active sheet or film 75 and the barrier sheet 80 are combined to form a packaging wrap having active characteristics at an interior surface formed by the entrained polymer 10 in the active sheet or film 75, and vapor resistant characteristics at an exterior surface formed by the barrier sheet 80. In this embodiment, the active sheet or film 75 occupies a portion of the barrier sheet 80. The methods according to the invention for making the active sheet or film 75 and adhering it to the barrier sheet 80 are particularly limited.

In one embodiment, the sheets of FIG. 5 are joined together to form an active package 85, as shown in FIG. 6. As shown, two laminates or composites are provided, each formed of an active sheet or film 75 joined with a barrier sheet 80. The sheet laminates are stacked, with the active sheet or film 75 facing one another, so as to be disposed on an interior of the package, and are joined at a sealing region 90, formed about a perimeter of the sealed region of the package interior.

Optionally, in any of the foregoing embodiments, the antimicrobial entrained polymer is in the form of a film that is disposed within a sealed food package. Optionally, the film may be adhered, e.g., using an adhesive, to an inner surface of the package. Alternatively, the film may be heat staked (without an adhesive) to the inner surface of the package. The process of heat staking film onto a substrate is known in the art and described in detail in U.S. Pat. No. 8,142,603, which is incorporated by reference herein in its entirety.

Alternatively, the film may be deposited and adhered to the inner surface of the package via a direct in-line melt process. The size and thickness of the film can vary. In certain embodiments, the film has a thickness of approximately 0.2 mm or 0.3 mm. Optionally, the film may range from 0.1 mm to 1.0 mm, more preferably from 0.2 mm to 0.6 mm.

Figure 8:
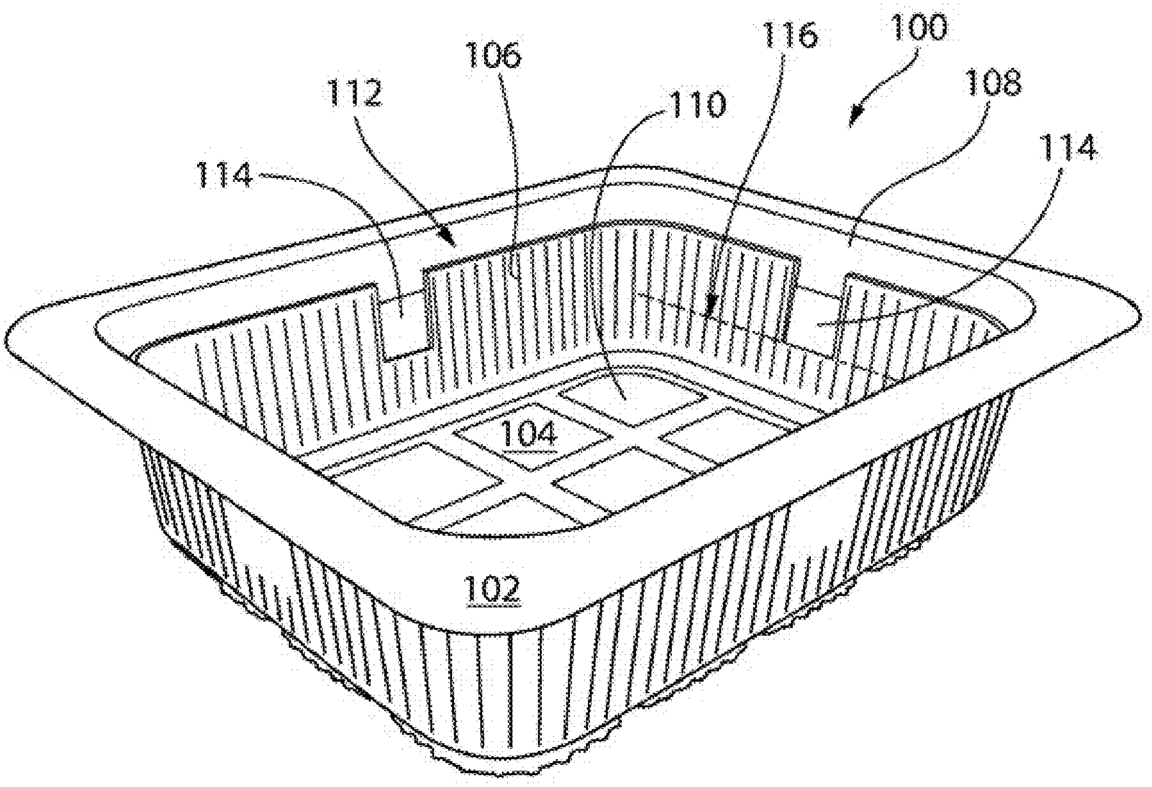
FIG. 8 is a perspective view of an exemplary package incorporating entrained polymer films according to an optional aspect of the disclosed concept.

Optionally, the entrained polymer film 114 is heat staked to the package (e.g., on the sidewall as described and shown vis-à-vis FIG. 8). Advantageously, heat staking could allow the film to permanently adhere to the sidewall without use of an adhesive. An adhesive may be problematic in some circumstances because it may release unwanted volatiles in the food-containing headspace. Aspects of a heat staking process that may be used in accordance with optional embodiments of the invention are disclosed in U.S. Pat. No. 8,142,603, as referenced above. Heat staking, in this instance, refers to heating a sealing layer substrate on the sidewall while exerting sufficient pressure on the film and sealing layer substrate to adhere the film to the container wall or to another substrate.

For example, in certain embodiments, the antimicrobial entrained polymer film 114 may be connected to the surface of the lidding film 112 (or a lid) that is inside of the container, in place of the film sections 114 on the sidewall(s) 106, or in addition thereto. Alternatively, the antimicrobial entrained polymer film 114 may be incorporated into the composition of the lidding film 112 (or a lid). Optionally, the lidding film itself may include a lid barrier layer and an antimicrobial entrained polymer film layer beneath it. Optionally in any embodiment in which the lid or lidding film is the substrate, the entrained polymer film may be heat staked thereto to adhere the entrained polymer film to the lid or lidding film.

In addition to placement of the film 114, another important factor is the release profile of the released antimicrobial material. As aforementioned, to ensure adequate shelf life, release of the agent is preferably controlled to a desired rate. For example, in some embodiments, release should not all occur immediately; rather, release may be more preferably extended, sustained and predetermined to attain a desired shelf life. However, in some applications, a shorter but more powerful "quick burst" of chlorine dioxide into the headspace may be desirable.

In general, the polymer entrained with antimicrobial releasing agent is self-activating, meaning that release of the released antimicrobial gas is not initiated until the antimicrobial releasing agent is exposed to the selected material, e.g., moisture. Typically, moisture is not present in the interior, e.g., headspace, of the container prior to a food product being placed inside of the container. Upon placement, the food product generates moisture that interacts with the antimicrobial releasing agent entrained in the polymer, to generate the antimicrobial releasing agent in the headspace. In one embodiment, the container is sealed in a moisture tight manner to trap moisture within the container generated by moisture-exuding comestibles.

In certain embodiments, a controlled release and/or a desired release profile can be achieved by applying a coating to the active agent, e.g., using a spray coater, wherein the coating is configured to release the released antimicrobial agent within a desired time frame. The antimicrobial releasing agents may have different coatings applied thereon to achieve different release effects. For example, if a 14-day shelf life is desired, based on predetermined relative humidity of the package, the amount of selected material (moisture) present to trigger the antimicrobial releasing agent may be determined. Based on this determination, the agent may be coated with extended release coatings of varying thicknesses and/or properties to achieve the desired release profile. For example, some active agent will be coated such that it will not begin releasing released antimicrobial material until after one week, while other active agent will begin release almost immediately. Spray coating technology is known in the art. For example, pharmaceutical beads and the like are spray coated to control the release rate of active ingredient, e.g., to create extended or sustained release drugs. Optionally, such technology may be adapted to apply coatings to the active agent to achieve a desired controlled rate of release of antimicrobial gas.

Alternatively, a controlled release and/or desired release profile may be achieved by providing a layer, optionally on both sides of the film, of a material configured to control moisture uptake into the entrained polymer (which in turn triggers release of the released antimicrobial material). For example, the film may include a polymer liner, made e.g., from low density polyethylene (LDPE) disposed on either side or both sides thereof. The thickness of the film and liner(s) can vary. In certain embodiments, the film is approximately 0.3 mm thick and the LDPE liners on either side are each approximately 0.02 mm to 0.04 mm thick. The LDPE liners may be coextruded with the film or laminated thereon.

Alternatively, a controlled release and/or desired release profile may be achieved by modifying the formulation of the trigger of the antimicrobial releasing agent. For example, the trigger, when contacted by moisture, liquefies and then reacts with the active component (e.g., sodium chlorite) to cause release of the antimicrobial gas. The trigger may be formulated to liquefy upon contact with moisture at different rates. The faster the trigger liquefies, the faster the release of antimicrobial gas and vice versa. In this way, modification of the trigger is yet another vehicle to provide a desired release rate of antimicrobial gas.

Any combination of the aforementioned mechanisms may be utilized to achieve desired release rates and release profiles of antimicrobial gas within a container headspace.

In an optional embodiment, a film prepared from the antimicrobial entrained polymer of the present invention provides on a per gram basis a $ClO_2$ concentration from 150 ppm to 2000 ppm at room temperature (23° C.), when gas release is initiated by contact with moisture under the standard conditions (see Examples). Optionally, the $ClO_2$ concentration is: from 150 ppm to 1800 ppm, optionally from 150 ppm to 1600 ppm, optionally from 150 ppm to 1200 ppm, optionally from 150 ppm to 1000 ppm, optionally from 150 ppm to 800 ppm, optionally from 150 ppm to 600 ppm, optionally from 150 ppm to 400 ppm, optionally from 150 ppm to 250 ppm, optionally from 400 ppm to 1800 ppm, optionally from 400 ppm to 1600 ppm, optionally from 400 ppm to 1200 ppm, optionally from 400 ppm to 1000 ppm, optionally from 400 ppm to 800 ppm, optionally from 400 ppm to 600 ppm, optionally from 600 ppm to 1800 ppm, optionally from 600 ppm to 1600 ppm, optionally from 600 ppm to 1200 ppm, optionally from 600 ppm to 1000 ppm, optionally from 600 ppm to 800 ppm, optionally from 800 ppm to 1800 ppm, optionally from 800 ppm to 1600 ppm, optionally from 800 ppm to 1200 ppm, optionally from 800 ppm to 1000 ppm, optionally from 1000 ppm to 1800 ppm, optionally from 1000 ppm to 1600 ppm, optionally from 100 ppm to 1200 ppm, optionally from 1200 ppm to 1800 ppm, optionally from 1200 ppm to 1600 ppm, optionally from 1600 ppm to 1800 ppm.

The $ClO_2$ concentration referred to herein is measured as follows. In a 2.1 L mason glass jar was placed a sponge (1"×1"×½") at the bottom. Water (10 mL) was added to the sponge. The water was completely absorbed in the sponge and there was no free water visible. A film strip (2 g, 1.7"×1", 0.3 mm in thickness) was placed at the bottom of the glass jar where there is no physical contact with the sponge. The glass jar was sealed and shielded from ambient light. The $ClO_2$ concentration in the headspace was monitored. A gas transport line including an output line and a return line diverted the air in the headspace to a portable $ClO_2$ gas analyzer before being returned.

Exemplary Containers or Packages According to Invention

The entrained polymer containing the antimicrobial releasing agent of the invention may optionally be utilized in food packages. Efficacy of the entrained polymer does not rely on direct contact with the food product stored in the package, but rather relies on release of chlorine dioxide into the package headspace to provide an antimicrobial effect on the food product. The entrained polymer may be attached, adhered, or otherwise included in any container or package via conventional methods. The container or package is used in commerce for food transportation, preservation and storage. The shape or geometry of the container or package is not limited.

FIG. 8 shows an optional package 100 for storing fresh foodstuffs, e.g., produce or meat, in accordance with certain embodiments of the invention. The package 100 is shown in the form of a plastic tray 102, although, other forms and materials are also contemplated as being within the scope of the invention. The tray 102 comprises a base 104, and sidewalls 106 extending vertically from the base 104 leading to a tray opening 108. The base 104 and sidewalls 106 together define an interior 110, e.g. for holding and storing fresh produce. The package 100 optionally includes a flexible plastic lidding film 112, which is disposed over and seals the opening 108. It is contemplated and understood that a wide variety of covers or lids may be used to close and seal the opening 108. Optionally, the cover or lid is transparent, such that the interior can be viewed. When a product (e.g., sliced tomatoes) is stored within the interior 110, empty space surrounding and above the product is herein referred to as "headspace" (not shown).

The package 100 further includes sections of antimicrobial entrained polymer film 114 disposed on the sidewalls 106. In the embodiment shown, there are four sections of such film 114, one section of film 114 per sidewall 106. The film 114 is preferably disposed at or near the top of the sidewall 106, proximal to the opening 108. At least a portion, although preferably most or all of each of the film sections 114 protrude above the midline 116 of the sidewall 106, the midline 116 being centrally located between the base 104 and the opening 108. It has been found that film placement at or towards the top of the package 100 has an effect on efficacy of the film sections 114, as such placement facilitates desirable distribution of released antimicrobial material into the headspace of the package 100. Placing the entrained polymer at too low of a height above the base 104, or beneath the food in the package, has been found not to provide desirable distribution of the released antimicrobial material in the headspace. If mass transfer of the antimicrobial is not optimal, some of the food product/good will not be adequately protected against the growth of microbes. Additionally, the food may undesirably react with and/or absorb the released antimicrobial material. It has been found that placing the film above the midline of the sidewall, preferably at a height of at least 67% or 75% or about 80% of the sidewall, facilitates achieving a desired antimicrobial gas release profile and headspace concentration.

Optionally, the entrained polymer film 114 is heat staked to the package (e.g., on the sidewall as described and shown vis-à-vis FIG. 8). Advantageously, heat staking could allow the film to permanently adhere to the sidewall without use of an adhesive. An adhesive may be problematic in some circumstances because it may release unwanted volatiles in the food-containing headspace. Aspects of a heat staking process that may be used in accordance with optional embodiments of the invention are disclosed in U.S. Pat. No. 8,142,603, as referenced above. Heat staking, in this instance, refers to heating a sealing layer substrate on the sidewall while exerting sufficient pressure on the film and sealing layer substrate to adhere the film to the container wall. Optionally, the entrained polymer film 114 is deposited and adhered to the package via a direct in-line melt adhesion process.

In certain embodiments, the antimicrobial entrained polymer film 114 may be connected to the surface of the lidding film 112 (or a lid) that is inside of the container, in place of the film sections 114 on the sidewall(s) 106, or in addition thereto. Alternatively, the antimicrobial entrained polymer film 114 may be incorporated into the composition of the lidding film 112 (or a lid).

Any combination of the aforementioned mechanisms may be utilized to achieve desired release rates and release profiles of antimicrobial gas within a container headspace.

Exemplary Embodiments

The following exemplary embodiments further describe optional aspects of the invention and are part of this specification. These exemplary embodiments are set forth in a format substantially akin to claims (each with a numerical designation followed by a letter designation), although they are not technically claims of the present application. The following exemplary embodiments refer to each other in dependent relationships as "embodiments" instead of "claims."

1A. An antimicrobial releasing agent comprising: a carrier material, an active compound, and a trigger, wherein the carrier material has a pH below 3.5, the active compound is a metal chlorite and the trigger comprises a hygroscopic compound.

2A. The antimicrobial releasing agent of embodiment 1A, wherein the carrier material is an acidified dry solid material.

3A. The antimicrobial releasing agent of embodiment 1A or 2A, wherein the carrier material has been treated with one or more acids.

4A. The antimicrobial releasing agent of any of embodiments 1A to 3A, wherein the carrier material is an acidified dry solid inorganic material.

5A. The antimicrobial releasing agent of any of embodiments 1A to 4A, wherein the carrier material is an acidified hydrophilic material.

6A. The antimicrobial releasing agent of any of embodiments 1A to 5A, wherein the pH is from about 0.5 to about 3.0, optionally from about 1.0 to about 3.0, optionally from about 1.0 to about 2.0, optionally from about 1.5 to about 1.8, or optionally from about 1.0 to about 1.5.

7A. The antimicrobial releasing agent of any of embodiments 1A to 6A, wherein the carrier material is an acidified silica gel.

8A. The antimicrobial releasing agent of any of embodiments 1A to 7A, wherein the active compound is a metal chlorite.

9A. The antimicrobial releasing agent of embodiment 8A, wherein the metal chlorite is an alkali metal chlorite, an alkaline earth metal chlorite, or a transition metal chlorite.

10A. The antimicrobial releasing agent of embodiment 8A, wherein the metal chlorite is at least one of sodium chlorite, potassium chlorite, barium chlorite, calcium chlorite, and magnesium chlorite.

10B. The antimicrobial releasing agent of embodiment 8A, wherein the metal chlorite is at least one of lithium chlorite, sodium chlorite, potassium chlorite, rubidium chlorite, cesium chlorite, and francium chlorite.

11A. The antimicrobial releasing agent of any of embodiments 9A, 10A, and 10B, wherein the metal chlorite is sodium chlorite.

12A. The antimicrobial releasing agent of any of embodiments 1A to 11A, wherein the trigger comprises at least one of sodium chloride, calcium chloride, magnesium chloride, lithium chloride, magnesium nitrate, copper sulfate, aluminum sulfate, magnesium sulfate, calcium carbonate, phosphorus pentoxide, and lithium bromide.

12B. The antimicrobial releasing agent of any of embodiments 1A to 11A, wherein the trigger comprises at least one of sodium chloride, magnesium chloride, calcium chloride, and calcium carbonate.

12C. The antimicrobial releasing agent of any of embodiments 1A to 11A, wherein the trigger is one or more members selected from the group consisting of: sodium chloride, magnesium chloride, calcium chloride, and calcium carbonate.

12D. The antimicrobial releasing agent of any of embodiments 1A to 11A, wherein the trigger is selected from the group consisting of: sodium chloride, magnesium chloride, calcium chloride, and calcium carbonate.

13A. The antimicrobial releasing agent of any of embodiments 1A to 12D, wherein the trigger comprises calcium chloride.

13B. The antimicrobial releasing agent of any of embodiments 1A to 12D and 13A, wherein the trigger comprises sodium chloride.

13C. The antimicrobial releasing agent of any of embodiments 1A to 12D and 13A to 13B, wherein the trigger comprises magnesium chloride.

13D. The antimicrobial releasing agent of any of embodiments 1A to 12D and 13A to 13C, wherein the trigger comprises calcium carbonate.

13E. The antimicrobial releasing agent of embodiment 13A, wherein the trigger is calcium chloride.

13F. The antimicrobial releasing agent of embodiment 13B, wherein the trigger is sodium chloride.

13G. The antimicrobial releasing agent of embodiment 13C, wherein the trigger is magnesium chloride.

13H. The antimicrobial releasing agent of embodiment 13D, wherein the trigger is calcium carbonate.

14A. The antimicrobial releasing agent of any of embodiments 1A to 13H, wherein the carrier material is 50-90%, optionally 60-90%, optionally 60-80%, optionally 60-70%, optionally 70-90%, optionally 70-80% by weight with respect to the total weight of the antimicrobial releasing agent.

15A. The antimicrobial releasing agent of any of embodiments 1A to 14A, wherein the metal chlorite is 5-30%, optionally 7-25%, optionally 9-20%, optionally 11-20% by weight with respect to the total weight of the antimicrobial releasing agent.

16A. The antimicrobial releasing agent of any of embodiments 1A to 15A, wherein the trigger is 2-20%, optionally 5-18%, optionally 8-15%, optionally about 10% by weight with respect to the total weight of the antimicrobial releasing agent.

1B. A method of preparing an antimicrobial releasing agent, comprising the steps of: (i) providing a carrier material; and (ii) mixing the carrier material with a trigger and an active compound to give the antimicrobial releasing agent, wherein the antimicrobial releasing agent comprises: (a) the carrier material; (b) the an active compound; and (c) the trigger, further wherein the carrier material has a pH below 3.5.

2B. The method of embodiment 1B, wherein the carrier material is provided by treating a hydrophilic material with a mineral acid followed by drying, optionally wherein the mineral acid is sulfuric acid, hydrochloric acid, or nitric acid.

3B. The method of embodiment 1B or 2B, wherein the carrier material is an acidified silica gel.

4B. The method of any of embodiments 1B to 3B, wherein the active compound comprises an alkali metal chlorite, an alkaline earth metal chlorite, or a transition metal chlorite.

5B. The method of any of embodiments 1B to 4B, wherein the trigger comprises a hygroscopic compound.

1C. An entrained polymer comprising: (i) a base polymer; (ii) an antimicrobial releasing agent; and (iii) optionally a channeling agent, wherein the antimicrobial releasing agent comprises: (a) a carrier material; (b) an active compound; and (c) a trigger, further wherein the carrier material has a pH below 3.5; optionally the active compound comprises an alkali metal chlorite, an alkaline earth metal chlorite, or a transition metal chlorite; and optionally the trigger comprises a hygroscopic compound.

2C. The entrained polymer of embodiment 1C, wherein the base polymer is in a range from 10% to 70%, optionally from 15% to 60%, optionally from 15% to 50%, optionally from 15% to 40%, optionally from 20% to 60%, optionally from 20% to 50%, optionally from 20% to 40%, optionally from 20% to 35%, optionally from 25% to 60%, optionally from 25% to 50%, optionally from 25% to 40%, optionally from 25% to 30%, optionally from 30% to 60%, optionally from 30% to 50%, optionally from 30% to 45%, optionally from 40% to 60%, optionally from 40% to 50% by weight of the entrained polymer.

3C. The entrained polymer of embodiment 1C or 2C, wherein the antimicrobial releasing agent is in a range 20% to 80%, optionally from 40% to 70%, optionally from 40% to 60%, optionally from 40% to 50%, optionally from 45% to 65%, optionally from 45% to 60%, optionally from 45% to 55%, optionally from 50% to 70%, optionally from 55% to 65% by weight with respect to the total weight of the entrained polymer.

4C. The entrained polymer of any of embodiments 1C to 3C, wherein the channeling agent is in a range from 2% to 25%, optionally from 2% to 20%, optionally from 2% to 15%, optionally from 5% to 15%, optionally from 5% to 10%, optionally from 8% to 15%, optionally from 8% to 10%, optionally from 10% to 20%, optionally from 10% to 15%, or optionally from 10% to 12% by weight with respect to the total weight of the entrained polymer.

1D. An entrained polymer material comprising an antimicrobial releasing agent, wherein the antimicrobial releasing agent comprises: (a) a carrier material; (b) an active compound; and (c) a trigger, wherein the carrier material has a pH below 3.5; optionally the active compound comprises an alkali metal chlorite, an alkaline earth metal chlorite, or a transition metal chlorite; and optionally the trigger comprises a hygroscopic compound.

1E. An entrained polymer material comprising an entrained polymer, wherein the entrained polymer comprises: (i) a base polymer; (ii) an antimicrobial releasing agent; and (iii) optionally a channeling agent, wherein the antimicrobial releasing agent comprises: (a) a carrier material; (b) an active compound; and (c) a trigger, further wherein the carrier material has a pH below 3.5; optionally the active compound comprises an alkali metal chlorites, an alkaline earth metal chlorite, or a transition metal chlorite; and optionally the trigger comprises a hygroscopic compound.

1F. The entrained polymer material of embodiment 1D or 1E, wherein the antimicrobial releasing agent releases $ClO_2$ at a concentration per gram of the entrained polymer material from 150 ppm to 1800 ppm, optionally from 400 ppm to 1600 ppm, optionally from 600 ppm to 1200 ppm, optionally from 800 ppm to 1000 ppm, when the concentration is measured with 2 g of the entrained polymer material in a 2.1 L jar containing a sponge soaked with 10 mL water.

1G. A container for inhibiting or preventing growth of microbes and/or for killing microbes within, the container comprising an antimicrobial releasing agent, wherein the antimicrobial releasing agent comprises: (a) a carrier material; (b) an active compound; and (c) a trigger, wherein the carrier material a pH below 3.5; optionally the active compound comprises an alkali metal chlorites, an alkaline earth metal chlorite, or a transition metal chlorite; and optionally the trigger comprises a hygroscopic compound.

1H. A container for inhibiting or preventing growth of microbes and/or for killing microbes within, the container comprising an entrained polymer material comprising: (i) a base polymer; (ii) an antimicrobial releasing agent; and (iii) optionally a channeling agent, wherein the antimicrobial releasing agent comprises: (a) a carrier material; (b) an active compound; and (c) a trigger, further wherein the carrier material has a pH below 3.5; optionally the active compound comprises an alkali metal chlorites, an alkaline earth metal chlorite, or a transitional metal chlorite; and optionally the trigger comprises a hygroscopic compound.

1I. Use of the container of embodiment 1G or embodiment 1H for storing and preserving comestible products.

The invention will be illustrated in more detail with reference to the following Examples, but it should be understood that the invention is not deemed to be limited thereto.

EXAMPLES

Example 1—$ClO_2$ Releasing Agent

To a 0.6 N sulfuric acid solution (about 20 L) was slowly added silica gel (25 Lbs.) to form a slurry. The slurry was mixed thoroughly, oven dried and cooled to room temperature. A 2 g sample of the acidified silica gel was suspended in 10 mL water. The pH of the aqueous phase was about 1.4-1.6.

A portion of the acidified silica gel (about 20 Lbs.) was mixed thoroughly with dry calcium chloride powder (about 2.5 Lbs.) before the dry sodium chlorite powder (about 3.2 Lbs.) was added. The mixture was again mixed thoroughly and was purged with nitrogen. The $ClO_2$ releasing agent thus prepared was sealed and stored under nitrogen.

A sample $ClO_2$ releasing agent is illustrated in Table 1 below.

TABLE 1

| $ClO_2$ Releasing Composition #1 | Weight % |
|---|---|
| Silica gel (pH ~1.6) | 77 |
| Calcium chloride | 10 |
| Sodium chlorite | 13 |

Other acidified silica gels of differing acidity were similarly prepared and incorporated into the corresponding $ClO_2$ releasing agent.

The $ClO_2$ releasing agent thus prepared was induced for $ClO_2$ release. In a 2.1 L mason glass jar was placed a sponge (1"×1"×½") at the bottom. Water (10 mL) was added to the sponge and was completely absorbed in the sponge and there was no free water visible. A sample of the $ClO_2$ releasing agent (2 g) was placed at the bottom of the glass jar where there is no physical contact with the sponge. The glass jar was sealed and shielded from ambient light. The $ClO_2$ concentration typically reached a peak at 2-4 hours at room temperature (23° C.).

The $ClO_2$ release of the $ClO_2$ releasing agent prepared with silica gel at differing acidity levels is summarized in Table 2 and is graphed in FIG. 7. The peak released $ClO_2$ concentration increases with increasing acidity of the silica gel carrier.

TABLE 2

The released $ClO_2$ concentration (ppm/g) at differing acidity of silica gel.

| Time (hrs) | pH 3.14 | pH 2.45 | pH 2.09 | pH 2.45 | pH 1.42 |
|---|---|---|---|---|---|
| 0 | 0 | 0 | 0 | 0 | 0 |
| 0.85 | 103 | 416 | 559 | 858 | 253 |
| 1.33 | 175 | 466 | 625 | 1085 | 530 |
| 1.83 | 208 | 487 | 654 | 1112 | 840 |
| 2.33 | 262 | 486 | 674 | 1067 | 1272 |
| 2.85 | 347 | 514 | 673 | 1038 | 1732 |
| 3.83 | 350 | 468 | 633 | 935 | 2339 |
| 4.30 | 416 | 453 | 636 | 931 | 2406 |
| 4.82 | 406 | 435 | 606 | 873 | 2406 |

Example 2—Entrained Polymer Containing Antimicrobial Releasing Agent

A film was extruded using an entrained polymer containing the antimicrobial releasing agent described above, a base polymer and a channeling agent according to Table 3 below. A typical thickness of the extruded film is 0.2 mm or 0.3 mm.

TABLE 3

Entrained Polymer Film Components

| Film # | Components | Weight % |
|---|---|---|
| 1 | $ClO_2$ Releasing Composition #1 | 50 |
| | Ethylene vinyl acetate | 43 |
| | PEG | 7 |

In a 2.1 L mason glass jar was placed a sponge (1"×1"×½") at the bottom. Water (10 mL) was added to the sponge and was completely absorbed in the sponge and there was no free water visible. A film strip (2 g, about 1.7"×1", 0.3 mm thick) was placed at the bottom of the glass jar where there is no physical contact with the sponge. The glass jar was sealed and shielded from ambient light.

A gas transport line including an output line and a return line was installed with two holes in the lid of the glass mason jar. The air in the headspace of the jar was directed to an ATI C16 portable $ClO_2$ gas analyzer (Analytical Technology Inc., Collegeville, PA) before being returned. Typically, the $ClO_2$ concentration peaks around 2-5 hours. The $ClO_2$ concentration referred to herein is measured as follows. In a 2.1 L mason glass jar was placed a sponge (1"×1"×½") at the bottom. Water (10 mL) was added to the sponge. The water was completely absorbed in the sponge and there was no free water visible. A film strip (2 g, 1.7"×1") was placed at the bottom of the glass jar where there is no physical contact with the sponge. The glass jar was sealed and shielded from ambient light. The $ClO_2$ concentration in the headspace was monitored.

The performance of the entrained polymer may also be characterized by the peak concentration of the $ClO_2$ released. The table immediately below (Table 4) illustrates the peak concentrations of some of the exemplary films incorporating the $ClO_2$ releasing agent according to invention identified by batch ID. Chlorine dioxide gas concentration typically reaches its peak after about 2-5 hours at room temperature (23° C.), and after about 22 hours at 4° C. The "Cloxout" powder and corresponding films identified in Table 4 refer to polymer films entrained with acidified silica gel according to an optional aspect of the invention. A single entry for Aseptrol powder and corresponding film is provided for reference.

TABLE 4

Peak $ClO_2$ Concentration of Films

| | Condition | | |
|---|---|---|---|
| | 23° C. Additive | 4° C. Production Format | 23° C. Production |
| | Powder | Film Unit | Film |
| | ppm/g | ppm/g | ppm/g |
| Aseptrol* | 2406.0 | — | 1213.8 |
| VB1 | 1774.0 | — | 980.7 |
| VB2 | 2369.4 | — | 1119.7 |
| VB3 | 2406.0 | — | 1203.0 |
| QB6 | 1305.3 | 527.2 | 661.5 |
| QB7 | 3369.0 | 821.1 | 1313.5 |
| QB8 | 2622.0 | 736.9 | 1622.5 |
| QB9 | 3840.7 | 968.3 | 1267.5 |
| QB10 | 3241.3 | 773.9 | 1035.0 |
| QB11 | 2416.7 | 732.9 | 934.8 |
| QB12 | 2114.7 | 339.0 | — |
| QB13 | 1643.7 | 861.0 | — |
| QB14 | 2007.7 | 758.3 | — |
| QB15 | 1663.7 | 789.3 | — |

*Aseptrol Film formulated at 12% channeling agent
Cloxout films formulated at 7% channeling agent Aseptrol film containing Aseptrol 50%, Carbowax 4000P 12%, and EVA 38%.

Example 3—Entrained Polymer Compared with Reference

Using Film 1 from Table 3 as an example, the $ClO_2$ release profile of the entrained polymer of the current invention is compared against a reference film as reported in WO 2005/041660. The reference firm formulation and preparation methods are set forth in Table 5, immediately below.

TABLE 5

Reference Films With Aseptrol and No Channeling Agent

| Sample | Formulation | Film Preparation Method |
|---|---|---|
| Reference 1 | Example A of WO 2005/041660: Aseptrol 7.05 - 50 wt. % Elvaloy 742 - 50 wt. % | Example 1 of WO 2005/041660 |
| Reference 2 | Example B of WO 2005/041660: Aseptrol 7.05 - 50 wt. % Elvaloy HP661 - 50 wt. % | Example 2 of WO 2005/041660 |

Figure 9:
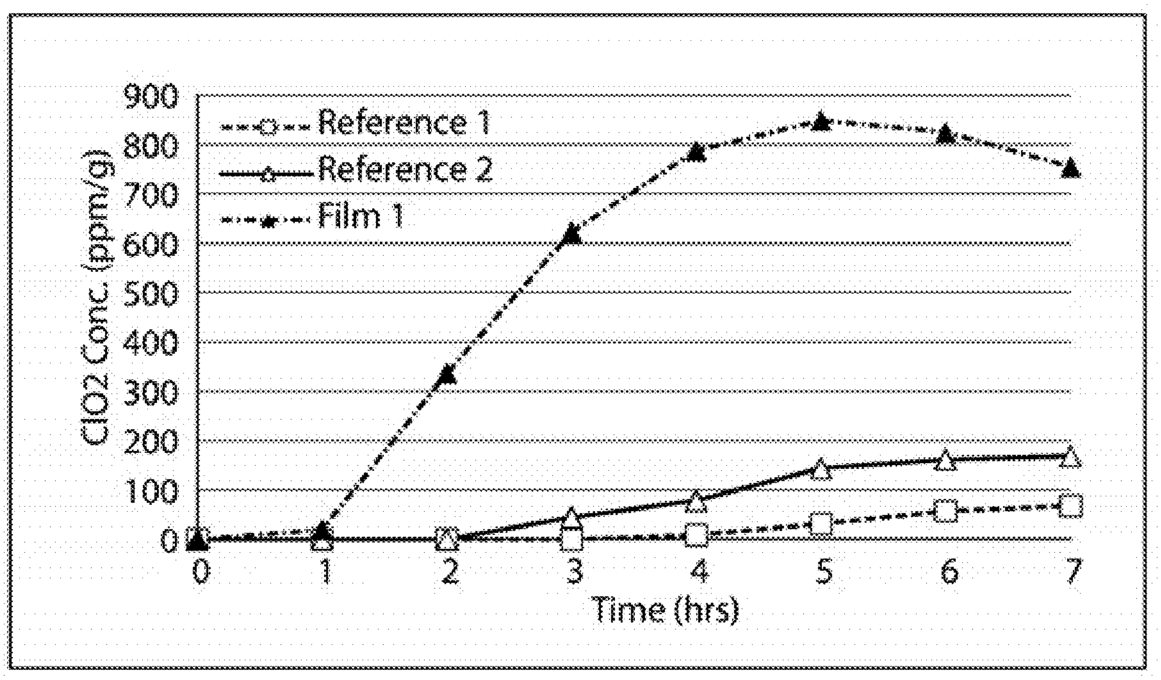
FIG. 9 is a graph of the $ClO_2$ release profile of an exemplary entrained polymer according to the disclosed concept against two reference standards.

The $ClO_2$ release properties of References 1 and 2 were evaluated using the measurement method described above in Examples 1 and 2. The released $ClO_2$ headspace concentration is shown in Table 6 below (normalized to ppm per gram of film) and is plotted in FIG. 9 together with that from Film 1 of an optional aspect of the invention.

TABLE 6

$ClO_2$ headspace concentration comparison (ppm/g of film)

| Time (hrs) | 1.00 | 2.00 | 3.00 | 4.00 | 5.00 | 6.00 | 7.00 |
|---|---|---|---|---|---|---|---|
| Reference 1[1] | 0 | 0 | 0 | 9 | 32 | 57 | 68 |
| Reference 2[1] | 0 | 0 | 44 | 78 | 144 | 162 | 169 |
| Film 1 | 0 | 20 | 337 | 623 | 849 | 825 | 755 |

[1]Film was formed of the cast material not after removal of the PET base polymer.

On a per gram basis, the Film 1 optional embodiment of the invention releases more than 4 times as much $ClO_2$ at peak concentration, and maintains the $ClO_2$ concentration for a sustained period of time.

In an effort to compare the $ClO_2$ release profile of the entrained polymer of the invention against the solution cast film of WO 2005/041660, Applicant attempted to prepare the solution cast film as reported in WO 2005/041660 by incorporating the acidified silica gel $ClO_2$ releasing agent of the invention. However, the Evaloy polymers were significantly degraded in the presence of the $ClO_2$ releasing agent of acidified silica gel, thus rendering the comparison impractical.

Example 4—Entrained Polymers: pH 1.4

Samples were prepared with a target pH of 1.4. Individual samples were prepared using each of (a) $CaCl_2$, (b) NaCl, (c) $MgCl_2$, and (d) $CaCO_3$ as the trigger.

Example 4a ($CaCl_2$)) Silica gel (200 g) was acid-washed for 1 h using a 334 mL solution of $3.9\times10^{-2}$ M sulfuric acid. The acidified silica gel was dried at 350° C. for 1 h, or until the moisture content was below 2%. The final moisture content for this material was 0.82%. A pH of 1.36 was found for the resulting material. To 12.95 g of the acidified silica gel in a QORPAK® glass jar was added 1.66 g of $CaCl_2$. The jar was shaken vigorously for 5 min to mix thoroughly. $NaClO_2$ (2.00 g) was then added, and the jar was then shaken vigorously for 5 min to mix thoroughly.

Example 4b (NaCl) In a separate QORPAK® jar, the steps used to prepare the Example 4a powder material were repeated, using NaCl in place of $CaCl_2$.

Example 4c ($MgCl_2$) In a separate QORPAK® jar, the steps used to prepare the Example 4a powder material were repeated, using $MgCl_2$ in place of $CaCl_2$.

Example 4d ($CaCO_3$) In a separate QORPAK® jar, the steps used to prepare the Example 4a powder material were repeated, using $CaCO_3$ in place of $CaCl_2$.

Figure 10:
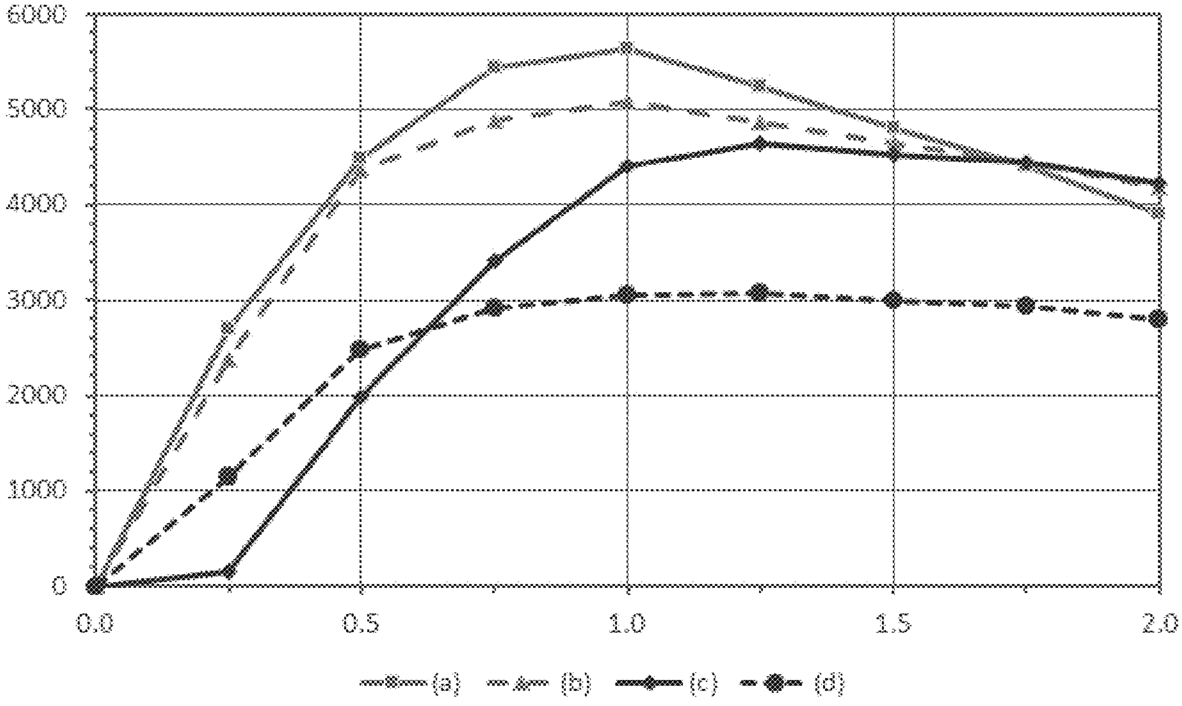
FIG. 10 is a graph of the $ClO_2$ release profile of exemplary materials of Example 4; horizontal axis=time (h); vertical axis=$ClO_2$ concentration (ppm/g); (a) $CaCl_2$) (b) NaCl (c) $MgCl_2$ (d) $CaCO_3$; according to the disclosed concept.

A 1 g aliquot of each of Examples 4a, 4b, 4c, and 4d was tested at an n=3 to determine $ClO_2$ strength or release concentration according to the procedure described for the Example 2 material. Results are presented in Table 7 and in FIG. 10.

TABLE 7

$ClO_2$ headspace concentration comparison of Example 4 material.

| | [$ClO_2$], ppm/g | | | |
|---|---|---|---|---|
| Time, h | 4a ($CaCl_2$) | 4b (NaCl) | 4c ($MgCl_2$) | 4d ($CaCO_3$) |
| 0.00 | 0.0 | 0.0 | 0.0 | 0.0 |
| 0.25 | 2685.7 | 2373.6 | 161.1 | 1144.3 |
| 0.50 | 4473.8 | 4363.4 | 1977.7 | 2474.2 |
| 0.75 | 5431.2 | 4886.3 | 3412.2 | 2913.4 |
| 1.00 | 5639.0 | 5086.0 | 4396.9 | 3056.5 |
| 1.25 | 5233.7 | 4868.9 | 4632.8 | 3082.2 |
| 1.50 | 4801.2 | 4649.7 | 4532.8 | 3002.7 |
| 1.75 | 4410.3 | 4434.5 | 4452.7 | 2928.3 |
| 2.00 | 3908.6 | 4192.7 | 4226.2 | 2786.8 |

Example 5—Entrained Polymers: pH 1.55

Samples were prepared with a target pH of 1.55. Individual samples were prepared using each of (a) $CaCl_2$, (b) NaCl, (c) $MgCl_2$, and (d) $CaCO_3$ as the trigger.

Example 5a ($CaCl_2$)) Silica gel (200 g) was acid-washed for 1 h using a 334 mL solution of $2.8\times10^{-2}$M sulfuric acid. The acidified silica gel was dried at 350° C. for 1 h or until the moisture content was below 2%. The final moisture content for this material was 0.83%. A pH of 1.65 was found for the resulting material. To 12.95 g of the acidified silica gel in a QORPAK® glass jar was added 1.66 g of $CaCl_2$. The jar was shaken vigorously for 5 min to mix thoroughly. $NaClO_2$ (2.00 g) was then added, and the jar was then shaken vigorously for 5 min to mix thoroughly.

Example 5b (NaCl) In a separate QORPAK® jar, the steps used to prepare the Example 5a powder material were repeated, using NaCl in place of $CaCl_2$.

Example 5c ($MgCl_2$) In a separate QORPAK® jar, the steps used to prepare the Example 5a powder material were repeated, using $MgCl_2$ in place of $CaCl_2$.

Example 5d ($CaCO_3$) In a separate QORPAK® jar, the steps used to prepare the Example 5a powder material were repeated, using $CaCO_3$ in place of $CaCl_2$.

Figure 11:
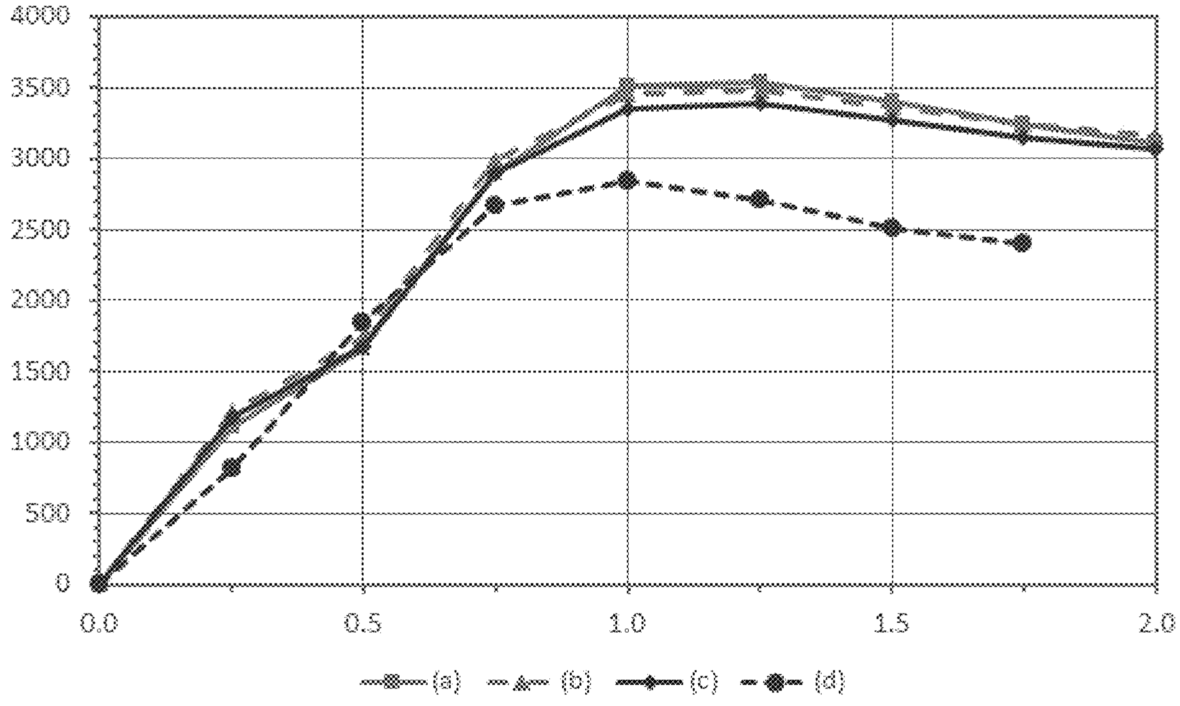
FIG. 11 is a graph of the $ClO_2$ release profile of exemplary materials of Example 5; horizontal axis=time (h); vertical axis=$ClO_2$ concentration (ppm/g); (a) $CaCl_2$) (b) NaCl (c) $MgCl_2$ (d) $CaCO_3$; according to the disclosed concept.

A 1 g aliquot of each of Examples 5a, 5b, 5c, and 5d was tested at an n=3 to determine $ClO_2$ strength or release concentration according to the procedure described for the Example 2 material. Results are presented in Table 8 and in FIG. 11.

TABLE 8

$ClO_2$ headspace concentration comparison of Example 5 material.

| | [$ClO_2$], ppm/g | | | |
|---|---|---|---|---|
| Time, h | 5a ($CaCl_2$) | 5b (NaCl) | 5c ($MgCl_2$) | 5d ($CaCO_3$) |
| 0.00 | 0 | 0 | 0 | 0 |
| 0.25 | 1113.503 | 1215.618 | 1175.663 | 816.95 |
| 0.50 | 1651.738 | 1732.718 | 1673.915 | 1843.275 |
| 0.75 | 2893.497 | 2988.563 | 2899.278 | 2672.029 |
| 1.00 | 3510.927 | 3450.44 | 3355.33 | 2838.382 |
| 1.25 | 3531.611 | 3486.184 | 3390.422 | 2707.558 |
| 1.50 | 3402.713 | 3360.081 | 3264.938 | 2506.698 |
| 1.75 | 3248.692 | 3237.042 | 3144.377 | 2409.431 |
| 2.00 | 3107.474 | 3157.923 | 3066.177 | |

Example 6—Entrained Polymers: pH 2.0

Samples were prepared with a target pH of 2.0. Individual samples were prepared using each of (a) $CaCl_2$, (b) NaCl, (c) $MgCl_2$, and (d) $CaCO_3$ as the trigger.

Example 6a ($CaCl_2$)) Silica gel (200 g) was acid-washed for 1 h using a 334 mL solution of 0.01 M sulfuric acid. The acidified silica gel was dried at 350° C. for 1 h or until the moisture content was below 2%. The final moisture content for this material was 0.73%. A pH of 2.19 was found for the resulting material. To 12.95 g of the acidified silica gel in a QORPAK® glass jar was added 1.66 g of $CaCl_2$. The jar was shaken vigorously for 5 min to mix thoroughly. $NaClO_2$ (2.00 g) was then added, and the jar was then shaken vigorously for 5 min to mix thoroughly.

Example 6b (NaCl) In a separate QORPAK® jar, the steps used to prepare the Example 6a powder material were repeated, using NaCl in place of $CaCl_2$.

Example 6c ($MgCl_2$) In a separate QORPAK® jar, the steps used to prepare the Example 6a powder material were repeated, using $MgCl_2$ in place of $CaCl_2$.

Example 6d ($CaCO_3$) In a separate QORPAK® jar, the steps used to prepare the Example 6a powder material were repeated, using $CaCO_3$ in place of $CaCl_2$.

Figure 12:
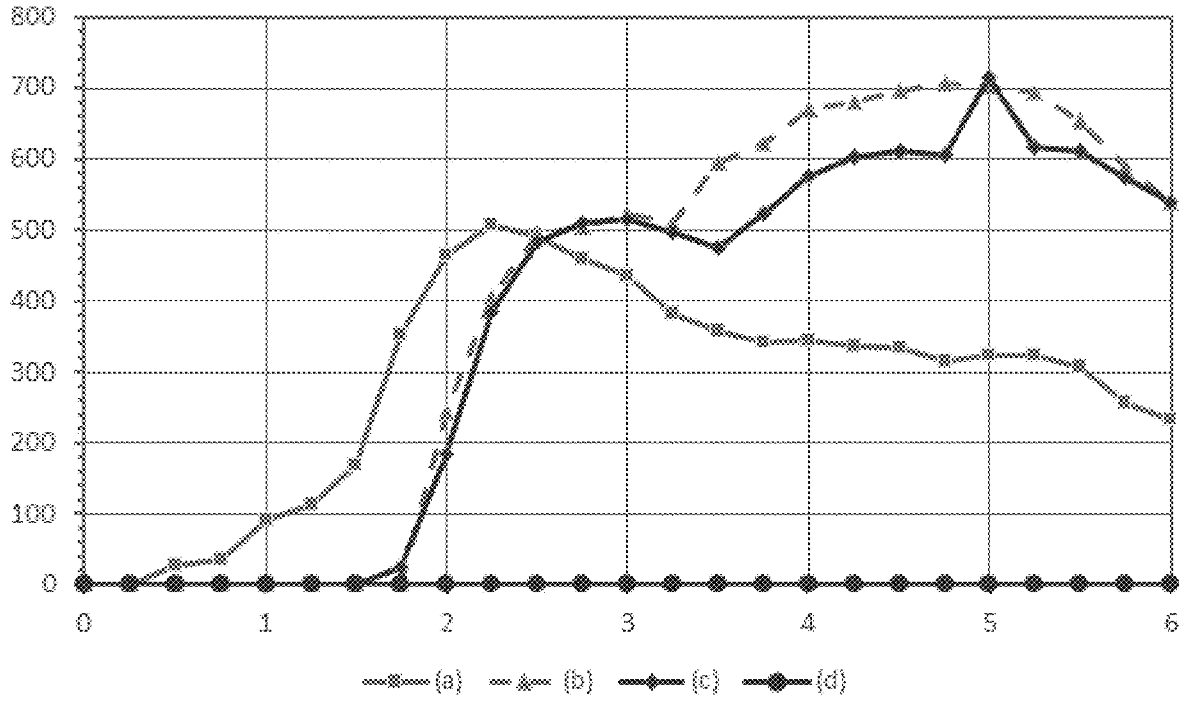
FIG. 12 is a graph of the $ClO_2$ release profile of exemplary materials of Example 6; horizontal axis=time (h); vertical axis=$ClO_2$ concentration (ppm/g); (a) $CaCl_2$) (b) NaCl (c) $MgCl_2$ (d) $CaCO_3$; according to the disclosed concept.

A 1 g aliquot of each of Examples 6a, 6b, 6c, and 6d was tested at an n=3 to determine $ClO_2$ strength or release concentration according to the procedure described for the Example 2 material. Results are presented in Table 9 and in FIG. 12.

TABLE 9

$ClO_2$ headspace concentration comparison of Example 6 material.

| | [$ClO_2$], ppm/g | | | |
|---|---|---|---|---|
| Time, h | 6a ($CaCl_2$) | 6b (NaCl) | 6c ($MgCl_2$) | 6d ($CaCO_3$) |
| 0.00 | 0.0 | 0.0 | 0.0 | 0.0 |
| 0.25 | 0.0 | 0.0 | 0.0 | 0.0 |
| 0.50 | 26.5 | 0.0 | 0.0 | 0.0 |
| 0.75 | 35.0 | 0.0 | 0.0 | 0.0 |
| 1.00 | 90.5 | 0.0 | 0.0 | 0.0 |
| 1.25 | 112.6 | 0.0 | 0.0 | 0.0 |
| 1.50 | 167.5 | 0.0 | 0.0 | 0.0 |
| 1.75 | 352.4 | 0.0 | 24.9 | 0.0 |
| 2.00 | 465.6 | 242.7 | 185.1 | 0.0 |
| 2.25 | 506.8 | 406.6 | 383.6 | 0.0 |
| 2.50 | 492.1 | 493.7 | 482.0 | 0.0 |
| 2.75 | 458.4 | 505.7 | 509.2 | 0.0 |
| 3.00 | 434.7 | 521.8 | 515.6 | 0.0 |
| 3.25 | 381.3 | 510.9 | 497.1 | 0.0 |
| 3.50 | 357.4 | 593.8 | 476.4 | 0.0 |
| 3.75 | 341.6 | 620.8 | 523.6 | 0.0 |
| 4.00 | 343.7 | 670.6 | 575.1 | 0.0 |
| 4.25 | 337.4 | 680.6 | 602.1 | 0.0 |
| 4.50 | 332.7 | 696.4 | 610.4 | 0.0 |
| 4.75 | 316.5 | 707.1 | 605.1 | 0.0 |
| 5.00 | 322.5 | 702.3 | 715.0 | 0.0 |
| 5.25 | 322.8 | 692.4 | 616.2 | 0.0 |
| 5.50 | 306.9 | 652.8 | 610.6 | 0.0 |
| 5.75 | 257.9 | 589.8 | 572.5 | 0.0 |
| 6.00 | 232.9 | 537.9 | 538.1 | 0.0 |

Example 7—Entrained Polymers: pH 3.1

Samples were prepared with a target pH of 3.1. Individual samples were prepared using each of (a) $CaCl_2$, (b) NaCl, (c) $MgCl_2$, and (d) $CaCO_3$ as the trigger.

Example 7a ($CaCl_2$)) Silica gel (200 g) was acid-washed for 1 h using a 334 mL solution of $6.4\times10^{-4}$M sulfuric acid. The acidified silica gel was dried at 350° C. for 1 h or until the moisture content was below 2%. The final moisture content for this material was 0.82%. A pH of 3.19 was found for the resulting material. To 12.95 g of the acidified silica gel in a QORPAK® glass jar was added 1.66 g of $CaCl_2$. The jar was shaken vigorously for 5 min to mix thoroughly. $NaClO_2$ (2.00 g) was then added, and the jar was then shaken vigorously for 5 min to mix thoroughly.

Example 7b (NaCl) In a separate QORPAK® jar, the steps used to prepare the Example 7a powder material were repeated, using NaCl in place of $CaCl_2$.

Example 7c ($MgCl_2$) In a separate QORPAK® jar, the steps used to prepare the Example 7a powder material were repeated, using $MgCl_2$ in place of $CaCl_2$.

Example 7d ($CaCO_3$) In a separate QORPAK® jar, the steps used to prepare the Example 7a powder material were repeated, using $CaCO_3$ in place of $CaCl_2$.

Figure 13:
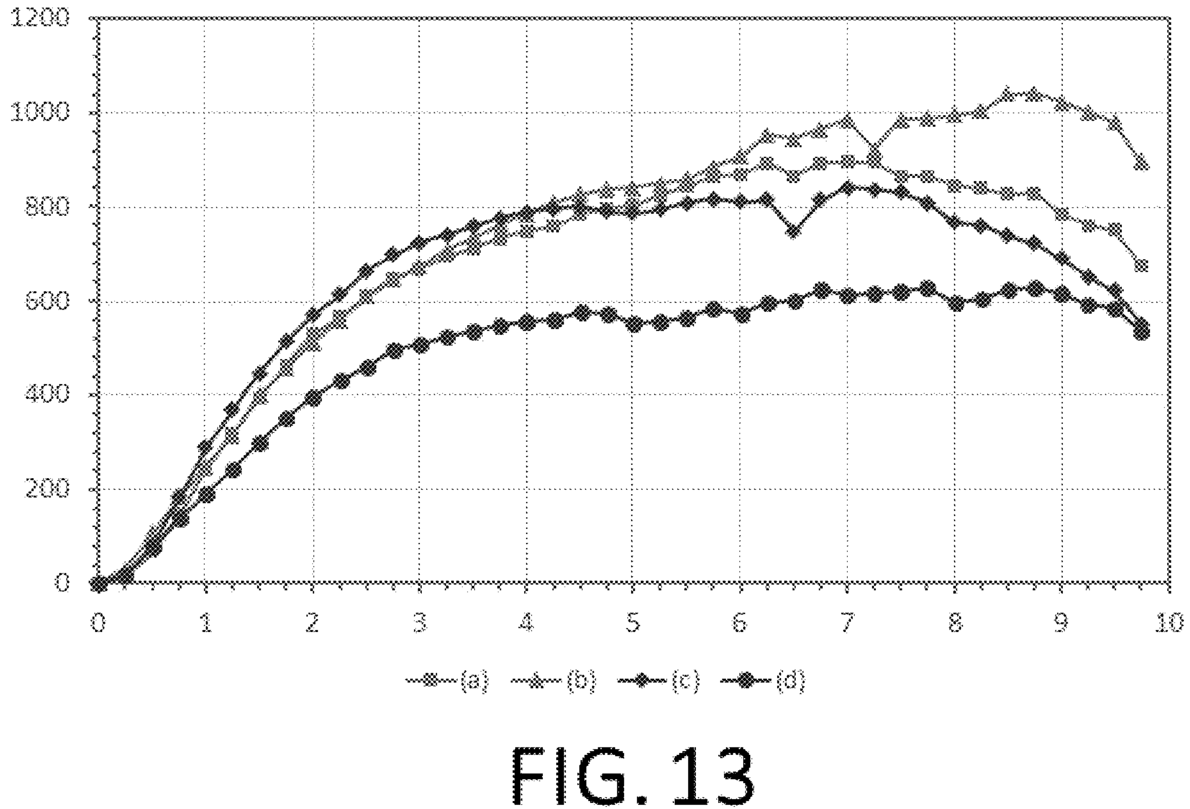
FIG. 13 is a graph of the $ClO_2$ release profile of exemplary materials of Example 7; horizontal axis=time (h); vertical axis=$ClO_2$ concentration (ppm/g); (a) $CaCl_2$) (b) NaCl (c) $MgCl_2$ (d) $CaCO_3$; according to the disclosed concept.

A 1 g aliquot of each of Examples 7a, 7b, 7c, and 7d was tested at an n=3 to determine $ClO_2$ strength or release concentration according to the procedure described for the Example 2 material. Results are presented in Table 10 and in FIG. 13.

TABLE 10

$ClO_2$ headspace concentration comparison of Example 7 material.

| | [$ClO_2$], ppm/g | | | |
|---|---|---|---|---|
| Time, h | 7a ($CaCl_2$) | 7b (NaCl) | 7c ($MgCl_2$) | 7d ($CaCO_3$) |
| 0.00 | 0.0 | 0.0 | 0.0 | 0.0 |
| 0.25 | 12.0 | 28.5 | 14.1 | 18.0 |
| 0.50 | 67.1 | 106.9 | 81.8 | 79.0 |
| 0.75 | 147.2 | 183.8 | 183.9 | 137.5 |
| 1.00 | 241.2 | 250.1 | 287.4 | 189.7 |
| 1.25 | 317.6 | 314.6 | 367.9 | 241.8 |
| 1.50 | 393.5 | 400.7 | 446.4 | 299.7 |
| 1.75 | 463.0 | 456.6 | 513.3 | 349.7 |
| 2.00 | 528.5 | 510.6 | 569.2 | 397.2 |
| 2.25 | 566.0 | 558.9 | 613.9 | 430.4 |
| 2.50 | 611.4 | 609.5 | 664.9 | 458.0 |
| 2.75 | 648.7 | 646.7 | 698.9 | 494.2 |
| 3.00 | 668.9 | 674.7 | 723.9 | 506.3 |
| 3.25 | 694.1 | 708.0 | 740.6 | 525.7 |
| 3.50 | 713.0 | 734.7 | 758.7 | 536.8 |
| 3.75 | 732.9 | 762.0 | 776.1 | 548.2 |
| 4.00 | 748.1 | 784.8 | 787.7 | 557.2 |
| 4.25 | 758.7 | 808.5 | 796.0 | 558.9 |
| 4.50 | 783.4 | 827.0 | 799.6 | 574.9 |
| 4.75 | 796.2 | 836.7 | 791.2 | 573.9 |
| 5.00 | 802.8 | 840.4 | 785.5 | 552.2 |
| 5.25 | 823.6 | 849.0 | 794.2 | 558.1 |
| 5.50 | 842.6 | 859.5 | 809.4 | 563.2 |
| 5.75 | 863.8 | 885.3 | 816.7 | 584.9 |
| 6.00 | 868.1 | 907.6 | 811.0 | 574.0 |
| 6.25 | 893.5 | 952.9 | 814.9 | 595.1 |
| 6.50 | 864.3 | 945.0 | 745.4 | 600.5 |
| 6.75 | 892.4 | 966.1 | 814.9 | 623.4 |
| 7.00 | 894.5 | 984.8 | 841.0 | 611.3 |
| 7.25 | 894.6 | 921.8 | 837.5 | 616.4 |
| 7.50 | 865.5 | 984.7 | 830.7 | 620.5 |
| 7.75 | 864.2 | 986.5 | 809.5 | 630.5 |
| 8.00 | 843.8 | 996.2 | 766.0 | 595.0 |
| 8.25 | 839.0 | 1002.9 | 760.7 | 602.7 |
| 8.50 | 826.0 | 1038.6 | 738.9 | 623.7 |
| 8.75 | 827.6 | 1041.1 | 722.1 | 628.3 |
| 9.00 | 785.4 | 1021.1 | 690.8 | 616.7 |
| 9.25 | 760.3 | 1000.7 | 651.7 | 594.2 |
| 9.50 | 750.8 | 978.8 | 621.0 | 585.2 |
| 9.75 | 675.4 | 895.2 | 550.7 | 535.8 |

While the invention has been described in detail and with reference to specific examples thereof, it will be apparent to one skilled in the art that various changes and modifications can be made therein without departing from the spirit and scope thereof.

What is claimed is:

1. An entrained polymer comprising:

(i) a base polymer;

(ii) a channeling agent present in a range of from 1% to 20% by weight with respect to the total weight of the entrained polymer; and (iii) an antimicrobial releasing agent in an amount of about 40% to about 70% by weight with respect to the total weight of the entrained polymer, the antimicrobial releasing agent comprising:

a carrier material comprising an acidified silica gel;

an active compound comprising a metal chlorite chosen from an alkali metal chlorite, an alkaline earth chlorite, and a transition metal chlorite; and a trigger comprising a hygroscopic compound;

wherein:

an aqueous phase of the carrier material has a pH from 1.4 to 3.1, and the entrained polymer is a monolithic material comprising interconnected channels resulting from mixing of the base polymer and the channeling agent.

2. The entrained polymer of claim 1 in a form of a film having a thickness of from 0.1 mm to 1.0 mm.

3. An entrained polymer capable of releasing chlorine dioxide gas, the entrained polymer comprising:

(i) a base polymer present in an amount of about 30% to about 50% by weight with respect to the total weight of the entrained polymer;

(ii) a channeling agent present in an amount of about 5% to about 12% by weight with respect to the total weight of the entrained polymer; and (iii) a dry mixture of an antimicrobial releasing agent present in an amount of about 35% to about 60% by weight with respect to the total weight of the entrained polymer;

and wherein the antimicrobial releasing agent comprises:

(i) a carrier material comprising an acidified silica gel wherein the aqueous phase of the carrier material having a pH from about 1.0 1.4 to about 3.1-3.5;

(ii) an active compound selected from sodium chlorite, potassium chlorite, lithium chlorite, calcium chlorite, barium chlorite, magnesium chlorite or a combination of two or more of the foregoing; and (iii) a trigger comprising a hygroscopic material, and wherein the entrained polymer comprises interconnected channels resulting from mixing of the base polymer and the channeling agent.

4. The entrained polymer of claim 3, wherein:

(i) the base polymer is selected from ethylene vinyl acetate, polypropylene, polyethylene, polyisoprene, polybutadiene, polybutene, polysiloxane, polycarbonates, polyamides, ethylene vinyl acetate, ethylene-methacrylate copolymer, poly(vinyl chloride), polystyrene, polylactic acid, polyanhydrides, polyacrylonitrile, polysulfones, polyacrylic ester, acrylic, polyurethane, polyacetal, or copolymers or mixtures thereof; and (iv) the channeling agent is selected from polyethylene glycol (PEG), ethylene-vinyl alcohol (EVOH), polyvinyl alcohol (PVOH), glycerin polyamine, polyurethane, polyacrylic acid, polymethacrylic acid, polypropylene oxide-monobutyl ether, polypropylene oxide monobutyl ether, polypropylene oxide, ethylene vinyl acetate, nylon 6, nylon 66, or any combination thereof.

5. The entrained polymer of claim 3, wherein:

(i) the base polymer is ethylene vinyl acetate;

(ii) the channeling agent is a polyethylene glycol (PEG);

(iii) the active compound of the antimicrobial releasing agent is sodium chlorite; and (iv) the trigger is one or more members selected from the group consisting of: sodium chloride, potassium chloride, magnesium chloride, calcium chloride, barium chloride, sodium carbonate, potassium carbonate, magnesium carbonate, calcium carbonate, and barium carbonate.

6. The entrained polymer of claim 5, wherein the trigger is one or more members selected from the group consisting of: sodium chloride, magnesium chloride, calcium chloride, and calcium carbonate.

7. The entrained polymer of claim 6, wherein the trigger is selected from the group consisting of: sodium chloride, magnesium chloride, calcium chloride, and calcium carbonate.

8. The entrained polymer of claim 7, wherein the trigger is calcium carbonate.

9. The entrained polymer of claim 5, wherein:

(i) the ethylene vinyl acetate is present in an amount of about 40% to about 45% by weight with respect to the total weight of the entrained polymer;

(ii) the polyethylene glycol (PEG) is present in an amount of about 5% to about 10% by weight with respect to the total weight of the entrained polymer;

(iii) the antimicrobial releasing agent is present in an amount of about 45% to about 55% by weight with respect to the total weight of the entrained polymer; and (iv) the trigger is calcium chloride;

and wherein:

(i) the acidified silica gel is present in an amount of about 70% to about 80% by weight with respect to the total weight of the antimicrobial releasing agent, (ii) the sodium chlorite is present in an amount of about 10% to about 15% by weight with respect to the total weight of the antimicrobial releasing agent, and (iii) the calcium chloride is present in an amount of about 7% to about 15% by weight with respect to the total weight of the antimicrobial releasing agent.

10. The entrained polymer of claim 5, wherein:

(i) the amount of the ethylene vinyl acetate is about 43% by weight with respect to the total weight of the entrained polymer;

(ii) the amount of the polyethylene glycol (PEG) is about 7% by weight with respect to the total weight of the entrained polymer; and (iii) the amount of the antimicrobial releasing agent is about 50% by weight with respect to the total weight of the entrained polymer;

and wherein:

(i) the acidified silica gel has a pH of from about 1.4 to about 3.1 3.5 and is present in an amount by weight of about 77% with respect to the total weight of the antimicrobial agent;

(ii) the sodium chlorite is present in an amount by weight of about 10% with respect to the total weight of the antimicrobial agent; and (iii) the calcium chloride is present in an amount by weight of about 13% with respect to the total weight of the antimicrobial agent.

11. The entrained polymer of claim 7, wherein total cumulative weight of the base polymer, the channeling agent, and the antimicrobial agent is equal to total weight of the entrained polymer.

12. The entrained polymer of claim 7 in a form of a film having a thickness of from 0.1 mm to 1.0 mm.

13. The entrained polymer of claim 9, wherein the film releases chlorine dioxide gas to provide a chlorine dioxide gas concentration of at least 100 ppm per gram of the film within about 1.5 hours of the antimicrobial agent being triggered or activated by moisture to cause release of the chlorine dioxide gas under the following conditions:

a sponge (1"×1"×½") is provided into a bottom of a 2.1 L mason glass jar, the sponge having 10 mL of water added to and completely absorbed by the sponge and a 2g strip of the film is provided into the bottom of the jar out of physical contact with the sponge, after which the jar is sealed and shielded from ambient light.

14. The entrained polymer of claim 9, wherein the film releases chlorine dioxide gas to provide a chlorine dioxide gas concentration of at least 150 ppm per gram of the film within about 1.5 hours of the antimicrobial agent being triggered or activated by moisture to cause release of the chlorine dioxide gas under the following conditions:

a sponge (1"×1"×½") is provided into a bottom of a 2.1 L mason glass jar, the sponge having 10 mL of water added to and completely absorbed by the sponge and a 2g strip of the film is provided into the bottom of the jar out of physical contact with the sponge, after which the jar is sealed and shielded from ambient light.

15. The entrained polymer of claim 9, wherein the film releases chlorine dioxide gas to provide a chlorine dioxide gas concentration of at least 200 ppm per gram of the film within about 2 hours of the antimicrobial agent being triggered or activated by moisture to cause release of the chlorine dioxide gas under the following conditions:

a sponge (1"×1"×½") is provided into a bottom of a 2.1 L mason glass jar, the sponge having 10 mL of water added to and completely absorbed by the sponge and a 2g strip of the film is provided into the bottom of the jar out of physical contact with the sponge, after which the jar is sealed and shielded from ambient light.

16. The entrained polymer of claim 9, wherein the film releases chlorine dioxide gas to provide a chlorine dioxide gas concentration of at least 500 ppm per gram of the film within about 3 hours of the antimicrobial agent being triggered or activated by moisture to cause release of the chlorine dioxide gas under the following conditions:

a sponge (1"×1"×½") is provided into a bottom of a 2.1 L mason glass jar, the sponge having 10 mL of water added to and completely absorbed by the sponge and a 2g strip of the film is provided into the bottom of the jar out of physical contact with the sponge, after which the jar is sealed and shielded from ambient light.

17. The entrained polymer of claim 9, wherein the film releases chlorine dioxide gas to provide a chlorine dioxide gas concentration of at least 700 ppm per gram of the film within about 4 hours of the antimicrobial agent being triggered or activated by moisture to cause release of the chlorine dioxide gas under the following conditions:

a sponge (1"×1"×½") is provided into a bottom of a 2.1 L mason glass jar, the sponge having 10 mL of water added to and completely absorbed by the sponge and a 2g strip of the film is provided into the bottom of the jar out of physical contact with the sponge, after which the jar is sealed and shielded from ambient light.

18. A package for inhibiting growth of microbes on a product located in a closed container, the package comprising:

a container, comprising:

a base;

a top opening;

one or more sidewalls extending in a vertical direction from the base to the top opening;

an interior space formed by the one or more sidewalls; and a cover to close and/or seal the opening;

the package further comprising at least one article made from the entrained polymer of claim 1 disposed within the container.

19. The package of claim 18, wherein the article is an entrained polymer film that is secured to at least one sidewall, the at least one sidewall having a sidewall midline that is equidistant from the base and the opening, the film having a film midline that is equidistant from a top edge and a bottom edge of the film, wherein the film midline is located at least as high as the sidewall midline.

20. The package of claim 18, wherein the article is disposed onto or integral with an underside of the cover.

21. The package of claim 18, wherein the article is a film and the cover is a lidding film, the film being heat staked to the underside of the lidding film.

22. The entrained polymer of claim 2, wherein the film releases chlorine dioxide gas within about 2-5 hours at room temperature.

* * * * *